United States Patent
Zhu et al.

(10) Patent No.: US 12,519,578 B2
(45) Date of Patent: Jan. 6, 2026

(54) MULTI-ACCESS MANAGEMENT SERVICES PACKET RECOVERY MECHANISMS

(71) Applicant: Intel Corporation, Santa Clara, CA (US)

(72) Inventors: Jing Zhu, Portland, OR (US); Pengfei Zhao, Beijing (CN); Nageen Himayat, Danville, CA (US); Vered Bar Bracha, Somerville, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/513,338

(22) Filed: Nov. 17, 2023

(65) Prior Publication Data
US 2024/0163030 A1 May 16, 2024

Related U.S. Application Data

(63) Continuation of application No. 16/956,358, filed as application No. PCT/US2019/024089 on Mar. 26, 2019, now Pat. No. 11,863,328.
(Continued)

(51) Int. Cl.
*H04L 1/1867* (2023.01)
*H04L 1/00* (2006.01)
(Continued)

(52) U.S. Cl.
CPC .......... *H04L 1/1874* (2013.01); *H04L 1/0076* (2013.01); *H04L 1/1642* (2013.01);
(Continued)

(58) Field of Classification Search
CPC ... H04L 1/1874; H04L 1/0076; H04L 1/1642; H04L 43/0835; H04L 47/2483; H04W 24/10
(Continued)

(56) References Cited

U.S. PATENT DOCUMENTS 7,123,617 B1 * 10/2006 Abrol .................... H04L 1/1809
370/471
8,018,890 B2 * 9/2011 Venkatachalam ....... H04L 1/188
370/279
(Continued)

FOREIGN PATENT DOCUMENTS

| WO | 2017189176 A2 | 11/2017 |
| WO | 2017196388 A1 | 11/2017 |
| WO | 2018057473 A1 | 3/2018 |

OTHER PUBLICATIONS

Minji Kim et al., "Network Coded TCP (CTTCP)", arXiv:1212.2291v3 [cs.NI], Apr. 12, 2013, 12 pages.
(Continued)

*Primary Examiner* — Albert Decady
*Assistant Examiner* — Osman M Alshack
(74) *Attorney, Agent, or Firm* — Schwabe, Williamson & Wyatt, P.C.

(57) ABSTRACT

Packet recovery mechanisms for wireless networks, which improve end-to-end (e2e) reliability, are provided. First embodiments include packet retransmission between a receiver and a transmitter, wherein, if the transmitter cannot find a lost packet in its transmission buffer, the transmitter sends a First Sequence Number (FSN) report to the receiver to notify the receiver of a sequence number (SN) of an oldest (acknowledged) packet in the buffer. In response, the receiver does not report lost packets whose SN is older than the FSN. Second embodiments involve using a network coding algorithm to recover lost packets, wherein the transmitter sends a control message to the receiver that includes a coded packet to be recovered and information for decoding the coded packet. Other embodiments may be described and/or claimed.

35 Claims, 14 Drawing Sheets

Related U.S. Application Data

(60) Provisional application No. 62/654,131, filed on Apr. 6, 2018, provisional application No. 62/650,901, filed on Mar. 30, 2018.

(51) Int. Cl.
  *H04L 1/1607* (2023.01)
  *H04L 43/0829* (2022.01)
  *H04L 47/2483* (2022.01)
  *H04W 24/10* (2009.01)

(52) U.S. Cl.
  CPC ...... *H04L 43/0835* (2013.01); *H04L 47/2483* (2013.01); *H04W 24/10* (2013.01)

(58) Field of Classification Search
  USPC .................................................. 714/748–750
  See application file for complete search history.

(56) References Cited

U.S. PATENT DOCUMENTS

| | | | |
|---|---|---|---|
| 8,488,523 B2 | 7/2013 | Chun et al. | |
| 8,743,797 B2 | 6/2014 | Park et al. | |
| 9,025,547 B2* | 5/2015 | Ko | H04L 1/1861 714/748 |
| 2005/0254508 A1* | 11/2005 | Aksu | H04L 1/0014 370/428 |
| 2006/0203794 A1 | 9/2006 | Sampath et al. | |
| 2007/0245201 A1* | 10/2007 | Sammour | H04L 1/1854 714/748 |
| 2008/0219204 A1* | 9/2008 | Lee | H04L 1/1812 370/315 |
| 2008/0317146 A1* | 12/2008 | Kwon | H04L 1/0071 375/295 |
| 2009/0279616 A1* | 11/2009 | Hamanaka | H04N 19/107 375/E7.279 |
| 2010/0195519 A1* | 8/2010 | Ji | H04L 1/187 370/252 |
| 2010/0284338 A1* | 11/2010 | Persson | H04L 49/90 370/328 |
| 2012/0110403 A1 | 5/2012 | Chen et al. | |
| 2012/0250547 A1* | 10/2012 | Fujita | H04W 4/06 370/312 |
| 2015/0019716 A1 | 1/2015 | Kim et al. | |
| 2015/0230175 A1* | 8/2015 | Grant | H04W 52/0216 370/329 |
| 2015/0358118 A1 | 12/2015 | Krigslund et al. | |
| 2017/0085591 A1 | 3/2017 | Ganda et al. | |
| 2017/0288821 A1* | 10/2017 | Baek | H04L 1/1635 |
| 2018/0183855 A1 | 6/2018 | Sabella et al. | |
| 2018/0191479 A1 | 7/2018 | Baek et al. | |
| 2018/0359801 A1 | 12/2018 | Kim et al. | |

OTHER PUBLICATIONS

J. Zhu et al., "User-Plane Protocols for Multiple Access Management Service draft-zhu-intarea-mams-user-protocol-04", Internet Draft, Jan. 22, 2018 [retrieved on Jun. 14, 2019], retrieved from: http://datatracker.ietf.org/doc/draft-zhu-intarea-mams-user-protocol/ 04, 17 pages.

International Search Report and Written Opinion dated Jul. 10, 2019 for International Patent Application PCT/US2019/024089, 11 pages.

Non-Final Office Action dated Nov. 21, 2022 from U.S. Appl. No. 16/956,358, 26 pages.

Non-Final Office Action dated May 4, 2023 from U.S. Appl. No. 16/956,358, 26 pages.

Notice of Allowance dated Aug. 25, 2023 from U.S. Appl. No. 16/956,358, 6 pages.

\* cited by examiner

MULTI-ACCESS MANAGEMENT SERVICES PACKET RECOVERY MECHANISMS

RELATED APPLICATIONS

This application is a continuation of U.S. patent application Ser. No. 16/956,358, entitled "MULTI-ACCESS MANAGEMENT SERVICES PACKET RECOVERY MECHANISMS" filed on Jun. 19, 2020, which is a national phase entry under U.S.C. § 371 of International Application No. PCT/US2019/024089, filed Mar. 26, 2019, entitled "MULTI-ACCESS MANAGEMENT SERVICES PACKET RECOVERY MECHANISMS", which, claims priority under 35 U.S.C. § 119 to U.S. Provisional Application No. 62/650,901 filed on Mar. 30, 2018 and U.S. Provisional Application No. 62/654,131 filed on Apr. 6, 2018, the contents of each of which are hereby incorporated by reference in their entireties.

FIELD

Various embodiments generally relate to the fields of computing, and in particular, relate to MAMS ("Multiple Access Management Service" or "Multi-Access Management Service") and MEC ("Multi-access Edge Computing" or "Mobile Edge Computing") technologies.

BACKGROUND

Today, a device can be simultaneously connected to multiple communication networks based on different technology implementations and network architectures, for example, WiFi, Long Term Evolution (LTE), Digital Subscriber Line (DSL), or the like. In such multi-connectivity scenarios, it may be desirable to combine multiple access networks or select a best access network to improve quality of experience for a user and improve overall network utilization and efficiency. The MAMS framework can be used to flexibly select a combination of uplink and downlink access network paths having optimal performance and/or enhanced quality of experience for user applications. However, MAMS does not include mechanisms for recovering lost packets due to interference, congestion, packet collisions, buffer overflow, etc., in wireless networks.

DETAILED DESCRIPTION

Figure 1:
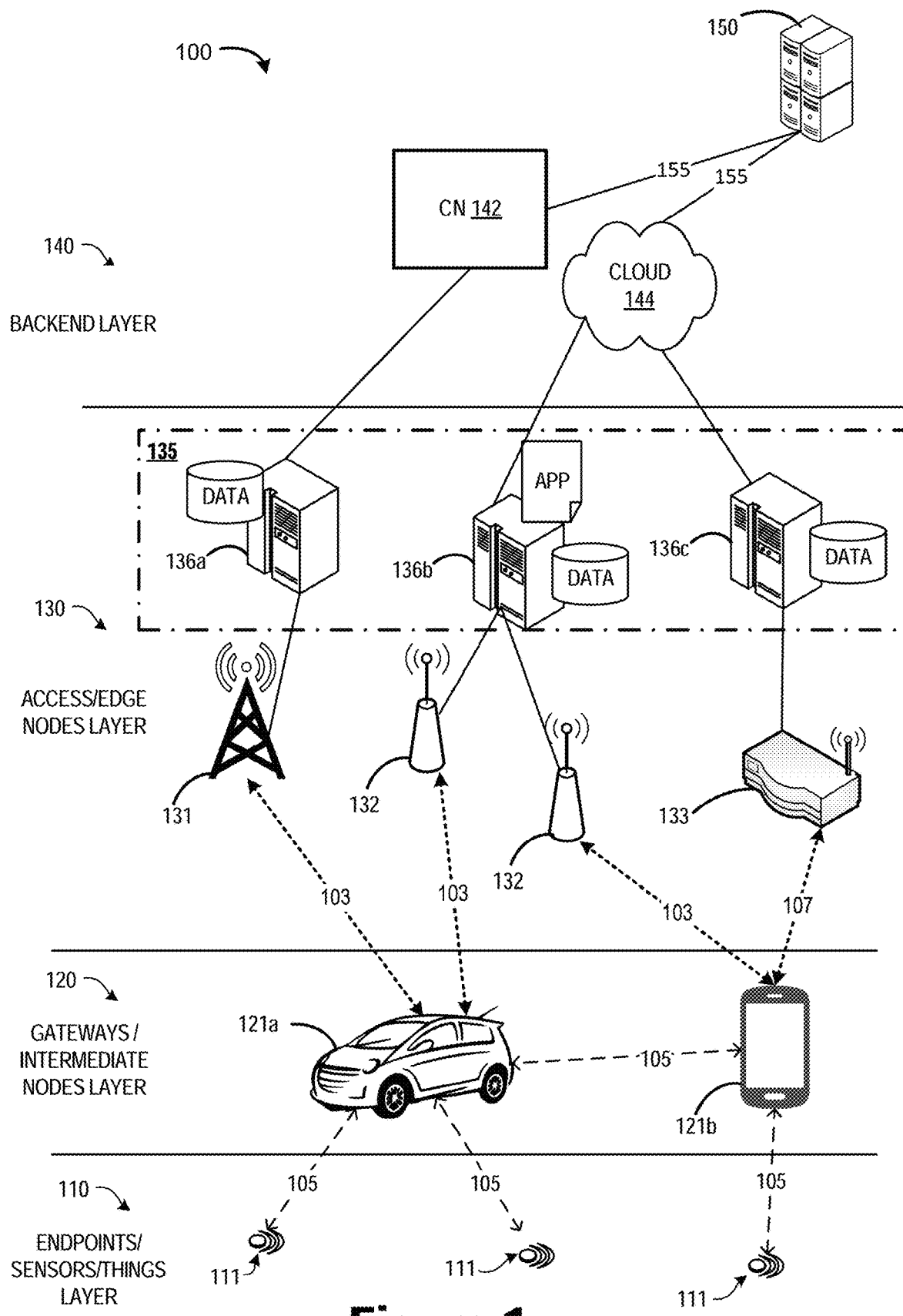
FIG. 1 depicts an example multi-access computing (MEC) environment in which various example embodiments may be practiced.

The present disclosure is related to packet recovery mechanisms in wireless networks, which improves end-to-end (e2e) reliability. Embodiments may utilize Multiple Access Management Service (MAMS), which is a programmable framework to select and configure network paths, as well as adapt to dynamic network conditions, when multiple network connections serve a client device. The MAMS framework is based on principles of user plane interworking, which can be deployed as an overlay without impacting the underlying networks. MAMS co-exists and complements existing communication protocols by providing a way to negotiate and configure the protocols based on client and network capabilities. Further it allows exchange of network state information and leveraging network intelligence to optimize the performance of such communication protocols. MAMS has minimal or no dependency on the actual access technology of the participating links, which allows MAMS to be scalable for addition of newer access technologies and for independent evolution of the existing access technologies.

The present disclosure provides embodiments for recovering lost packets due to temporary interference, collisions, congestions, buffer overflow, etc., in wireless networks overlaid with MAMS. First embodiments involve e2e retransmission between a receiver device and a transmitter device such that any packet that has been lost on the delivery path can be detected and retransmitted. In the first embodiments, the receiver sends a Negative Acknowledgement (NACK) message to the transmitter when a packet loss is detected by the receiver. In response to receipt of the NACK message by the transmitter, the transmitter attempts to identify, in its transmission buffer, the lost packet indicated by the NACK message. If the transmitter cannot find the lost packet in its buffer, the transmitter sends a First Sequence Number (FSN) message to the receiver to indicate a Sequence Number (SN) of the oldest (acknowledged) packet in the buffer. In response, the receiver does not report any lost packets whose SN is smaller (i.e., older) than the FSN. In some embodiments, a minimal NACK time interval (T) may be inserted between two successive NACK reports to avoid unnecessary retransmission. The minimum NACK time interval may be configured by a MAMS server through one or more control messages. The first embodiments are useful for networks that have a limited number of retransmissions due to, for example, limited bandwidth, crowded spectrum, or the like.

Second embodiments involve using packet coding and decoding to recover lost packets. In this embodiment, an SN is added to each of the IP packets that are sent between a transmitter (e.g., a MAMS server) and a receiver (e.g., a UE). Additionally, a new control message is defined, which is used to deliver a coded SDU. The coded SDU is generated by applying a network coding technique to one or multiple consecutive SDUs. The receiver may use the coded SDU to recover any of the SDUs that are used in the coding. For example, given two packets (packet A and packet B), a packet (packet C) may be generated by applying an exclusive OR operation (XOR or $\oplus$) between the two packets. If packet A is lost, packet A may be recovered by B$\oplus$C. Similarly, if packet B is lost, packet B may be obtained by A$\oplus$C. More than two packets may be used to recover lost packets in other embodiments. In one example, Random Linear Network Coding (RLNC) may be used to reconstruct or reconstruct lost packets. Other embodiments may be described and/or claimed.

Referring now to FIG. 1, where a multi-access computing (MEC) environment 100 in accordance with various embodiments, is shown. FIG. 1 specifically illustrates the different layers of communication occurring within the environment 100, starting from endpoint sensors or things layer 110 (e.g., operating in an Internet of Things (IoT) network topology) comprising one or more IoT devices 111 (also referred to as edge endpoints 110 or the like); increasing in sophistication to gateways or intermediate node layer 120 comprising one or more user equipment (UEs) 121a and 121b (also referred to as intermediate nodes 120 or the like), which facilitate the collection and processing of data from endpoints 110; increasing in processing and connectivity sophistication to access or edge node layer 130 comprising a plurality of access nodes (ANs) 131, 132, and 133 (also referred to as edge compute nodes 130 or the like); and increasing in connectivity and processing sophistication to a backend layer 140 comprising core network (CN) 142 and cloud 144. The processing at the backend layer 140 may be enhanced by network services as performed by a remote application server 150 and/or other cloud services.

An end-user device, such as an intermediate node 120 or endpoint 110 has access to multiple communication networks based on different technologies, for example, LTE or new radio (NR)/fifth generation (5G) cellular technology (e.g., as provided by AN 131 and/or ANs 132), WiFi (e.g., as provided by AN 133 and/or ANs 132), DSL, MuLTEfire, etc., for accessing application services. Different technologies exhibit benefits and limitations in different scenarios, and application performance in different scenarios becomes dependent on the choice of the access networks (e.g., WiFi, LTE, etc.) and the used network and transport protocols (e.g., VPN, MPTCP, GRE etc.). For example, WiFi may provide high throughput for intermediate nodes 120 and endpoints 110 when under relatively good coverage, but the throughput degrades significantly as the user moves closer to the edge of WiFi coverage area or when an AN 133 serves a relatively large user population (e.g., due to contention based WiFi access scheme). In LTE or NR networks, the capacity is often constrained by the limited availability of licensed spectrum, but the quality of the service is predictable even in multi-user scenarios due to the exclusivity of the licensed spectrum and the controlled scheduling provided by a serving base station.

Unlike LTE and NR networks that use licensed spectrum, WiFi is a shared medium that operates in the unlicensed radiofrequency (RF) of 2.4 GHz and 5 GHz ranges. The 3GPP variant of unlicensed access is called Licensed Assisted Access (LAA). LAA, aims to design LTE and/or NR specifications for global harmonization that allow for fair coexistence with WiFi and other networks in a shared medium. LAA employs a medium access scheme similar to WiFi's Enhanced Distributed Channel Access (EDCA). The coexistence impact on fairness and throughput with respect to LTE and/or NR is also a current challenge for both standards. One issue that may arise when utilizing network technologies that operated in a shared medium is that packets may be lost during transmission due to, for example, temporary interference, packet collisions, congestion, and buffer overflow.

In current WiFi-based protocols, Media Access Control (MAC) protocols support limited retransmissions to recover lost packets. In particular, a WiFi transmitter will give up and drop a packet when a maximum retransmission limit is reached. Additionally, the WiFi-based retransmission method is not applicable when a packet is dropped due to temporary congestion and/or buffer overflow. Similarly, LAA uses a contention window size (CWS) for retransmitting lost packets, where the CWS increases in an exponential manner based on the Hybrid Automatic Repeat Request (HARQ)-Acknowledgement (ACK) in the MAC layer.

The present disclosure provides embodiments for recovering lost packets that are an improvement over existing packet recovery mechanisms, such as those discussed previously. First embodiments involve e2e retransmission between a receiver device and a transmitter device such that any packet that has been lost on the delivery path can be detected and retransmitted. Second embodiments involve using packet coding and decoding to recover lost packets, wherein the transmitter device generates an encoded packet based on at least two previously sent packets and sends the encoded packet to the receiver device to be decoded by the receiver device. In either of these embodiments, the receiver device (or simply the "receiver") may be an endpoint 110 or intermediate node 120 and the transmitter device (or simply the "transmitter") may be an edge compute node 130, or vice versa. In either of the aforementioned embodiments, the transmitter and receiver may implement a protocol stack including one or more MAMS entities. In some embodiments, these protocol stack entities may operate below layer 3 (L3) (e.g., the IP layer) and above layer 2 (L2) (e.g., link layer) entities. In some implementations, the MAMS entities may reside on a MEC platform. The aforementioned embodiments improve the performance (e.g., e2e reliability) of the underlying network technologies while retaining the benefits of the MAMS framework and the underlying network technologies. The various aspects of the embodiments are discussed in more detail infra with respect to FIGS. 2-9.

Referring back to FIG. 1, the environment 100 is shown to include a UE 121a and UE 121b (collectively referred to as "UE 121" or "UEs 121"). In this example, the UE 121a is illustrated as a vehicle UE, and UE 121b is illustrated as a smartphone (e.g., handheld touchscreen mobile computing device connectable to one or more cellular networks). However, these UEs 121 may comprise any mobile or non-mobile computing device, such as tablet computers, wearable devices, Personal Data Assistants (PDAs), pagers, desktop computers, wireless handsets, unmanned vehicles or drones, and/or any type of computing device including a wireless communications interface.

Environment 100 also includes IoT devices 111, which are uniquely identifiable embedded computing devices (e.g., within the Internet infrastructure) that comprise a network access layer designed for low-power IoT applications utilizing short-lived UE connections. The IoT devices 111 may be any objects, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. For instance, in various embodiments, IoT devices 111 may be abiotic devices such as autonomous sensors, gauges, meters, image capture devices, microphones, light emitting devices, audio emitting devices, audio and/or video playback devices, electro-mechanical devices (e.g., switch, actuator, etc.), and the like. The IoT devices 111 can utilize technologies such as machine-to-machine (M2M) or machine-type communications (MTC) for exchanging data with an MTC server (e.g., a server 150), a MEC server 136 and/or MEC system, or device via a PLMN, ProSe or D2D communication, sensor networks, or IoT networks. The M2M or MTC exchange of data may be a machine-initiated exchange of data.

The IoT devices 111 may execute background applications (e.g., keep-alive messages, status updates, etc.) to facilitate the connections of the IoT network. Where the IoT devices 111 are, or are embedded in, sensor devices, the IoT network may be a wireless sensor network (WSN). An IoT network describes an interconnecting IoT UEs, such as the IoT devices 111 being connected to one another over respective direct links 105. The IoT devices may include any number of different types of devices, grouped in various combinations (referred to as an "IoT group") that may include IoT devices that provide one or more services for a particular user, customer, organizations, etc. A service provider (e.g., an owner/operator of server 150, CN 142, and/or cloud 144) may deploy the IoT devices in the IoT group to a particular area (e.g., a geolocation, building, etc.) in order to provide the one or more services. In some implementations, the IoT network may be a mesh network of IoT devices 111, which may be termed a fog device, fog system, or fog, operating at the edge of the cloud 144. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 144 to Things (e.g., IoT devices 111). The fog may be established in accordance with specifications released by the OpenFog Consortium (OFC), the Open Connectivity Foundation™ (OCF), among others. In some embodiments, the fog may be a tangle as defined by the IOTA foundation.

The fog may be used to perform low-latency computation/aggregation on the data while routing it to an edge cloud computing service (e.g., edge nodes 130) and/or a central cloud computing service (e.g., cloud 144) for performing heavy computations or computationally burdensome tasks. On the other hand, edge cloud computing consolidates human-operated, voluntary resources, as a cloud. These voluntary resource may include, inter-alia, intermediate nodes 120 and/or endpoints 110, desktop PCs, tablets, smartphones, nano data centers, and the like. In various implementations, resources in the edge cloud may be in one to two-hop proximity to the IoT devices 111, which may result in reducing overhead related to processing data and may reduce network delay.

In some embodiments, the fog may be a consolidation of IoT devices 111 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks offloaded by edge resources.

In embodiments, the fog may operate at the edge of the cloud 144. The fog operating at the edge of the cloud 144 may overlap or be subsumed into an edge network 130 of the cloud 144. The edge network of the cloud 144 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes or edge devices). The Fog layer resides on top of the edge layer and is a consolidation of networking devices such as the intermediate nodes 120 and/or endpoints 110 of FIG. 1.

Data may be captured, stored/recorded, and communicated among the IoT devices 1804 (or, for example, among the intermediate nodes 120 and/or endpoints 110 that have direct links 105 with one another as shown by FIG. 1). Analysis of the traffic flow and control schemes may be implemented by aggregators that are in communication with the IoT devices 111 and each other through a mesh network. The aggregators may be a type of IoT device 111 and/or network appliance. In the example of FIG. 1, the aggregators may be edge nodes 130, or one or more designated intermediate nodes 120 and/or endpoints 110. Data may be uploaded to the cloud 144 via the aggregator, and commands can be received from the cloud 144 through gateway devices that are in communication with the IoT devices 111 and the aggregators through the mesh network. Unlike the traditional cloud computing model, in some implementations, the cloud 144 may have little or no computational capabilities and only serves as a repository for archiving data recorded and processed by the fog. In these implementations, the cloud 144 centralized data storage system and provides reliability and access to data by the computing resources in the fog and/or edge devices. Being at the core of the architecture, the Data Store of the cloud 144 is accessible by both Edge and Fog layers of the aforementioned edge-fog network.

The UEs 121 and IoT devices 111 may be configured to connect, for example, communicatively couple, with Radio Access Network (RAN) including one or more of the ANs 131, 132, and/or 133. In embodiments, the RAN may be an NG RAN or a 5G RAN, an E-UTRAN, or a legacy RAN, such as a UTRAN or GERAN. As used herein, the term "NG RAN" may refer to a RAN that operates in an NR or 5G system, and the term "E-UTRAN" or the like may refer to a RAN that operates in an LTE or 4G system. The UEs 121 and IoT devices 111 may utilize respective connections (or channels) 103, respectively, each of which comprises a physical communications interface or layer. In this example, the connections 103 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein.

In embodiments, the UEs 121 and IoT devices 111 may further directly exchange communication data via respective direct interfaces (or links) 105. In some implementations the interfaces 105 may be a WiFi based link or a personal area network (PAN) based link (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols). In other implementations, the interface 105 may be an LTE/NR Proximity Services (ProSe) link or PC5 interface.

According to various embodiments, the UEs 121 and IoT devices 111 and the RAN nodes 131/132 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. To operate in the unlicensed spectrum, the UEs 121 and IoT devices 111 and the RAN nodes 131/132 may operate using LAA, enhanced LAA (eLAA), and/or further eLAA (feLAA) mechanisms. In these implementations, the UEs 121 and IoT devices 111 and the RAN nodes 131/132 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol. LBT is a mechanism whereby equipment (e.g., UEs 121 and IoT devices 111, RAN nodes 131/132, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

The UE 121*b* is shown to be configured to access an access point (AP) 133 via a connection 107. The connection 107 can comprise a local wireless connection, such as a connection consistent with any IEEE 802.11 protocol, wherein the AP 133 would comprise a wireless fidelity (WiFi®) router. In this example, the AP 133 is shown to be connected to the Internet without connecting to the CN 120 of the wireless system. In various embodiments, the UE 121*b*, RAN nodes 131/132, and AP 106 may be configured to utilize LWA operation and/or LWIP operation. The LWA operation may involve the UE 121*b* being configured by a RAN node 131/132 to utilize radio resources of LTE/NR and WLAN. LWIP operation may involve the UE 121*b* using WLAN radio resources (e.g., connection 107) via IPsec protocol tunneling to authenticate and encrypt packets (e.g., IP packets) sent over the connection 107. IPsec tunneling includes encapsulating the entirety of original IP packets and adding a new packet header, thereby protecting the original header of the IP packets.

The RAN can include one or more AN nodes or RAN nodes 131 and 132 (collectively referred to as "RAN nodes" or "RAN node") that enable the connections 103. As used herein, the terms "access node," "access point," or the like may describe equipment that provides the radio baseband functions for data and/or voice connectivity between a network and one or more users.

In this example, the RAN node 131 is embodied as a NodeB, evolved NodeB (eNB), or a next generation NodeB (gNB), and the RAN nodes 132 are embodied as Road Side Unites (RSUs). Any other type of ANs can be used, and the ANs may comprise ground stations (e.g., terrestrial access points) or satellite stations providing coverage within a geographic area (e.g., a cell). As used herein, the term "NG RAN node" or the like may refer to a RAN node 111 that operates in an NR or 5G system (for example, a gNB), and the term "E-UTRAN node" or the like may refer to a RAN node 131 that operates in an LTE or 4G system (e.g., an eNB). According to various embodiments, the RAN nodes 131 may be implemented as one or more of a dedicated physical device such as a macrocell base station, and/or a low power base station for providing femtocells, picocells or other like cells having smaller coverage areas, smaller user capacity, or higher bandwidth compared to macrocells.

In some embodiments, all or parts of the RAN nodes 131/132 may be implemented as one or more software entities running on server computers as part of a virtual network, which may be referred to as a cloud RAN (CRAN) and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 131/132; a MAC/PHY split wherein RRC, PDCP, RLC, and MAC layers are operated by the CRAN/vBBUP and the PHY layer is operated by individual RAN nodes 131/132; or a "lower PHY" split wherein RRC, PDCP, RLC, MAC layers and upper portions of the PHY layer are operated by the CRAN/vBBUP and lower portions of the PHY layer are operated by individual RAN nodes 131/132. This virtualized framework allows the freed-up processor cores of the RAN nodes 131/132 to perform other virtualized applications. In some implementations, an individual RAN node 131/132 may represent individual gNB-DUs that are connected to a gNB-CU via individual 15 interfaces (not shown by FIG. 1). In these implementations, the gNB-DUs include one or more remote radio heads or RFEMs (see, e.g., FIG. 12), and the gNB-CU may be operated by a server that is located in the RAN (not shown) or by a server pool in a similar manner as the CRAN/vBBUP. Additionally or alternatively, one or more of the RAN nodes 131/132 may be next generation eNBs (ng-eNBs), which are RAN nodes 131/132 that provide E-UTRA user plane and control plane protocol terminations toward the UEs 121, and are connected to a 5GC via an NG interface.

Any of the RAN nodes 131/132 can terminate the air interface protocol and can be the first point of contact for the UEs 121 and IoT devices 111. In some embodiments, any of the RAN nodes 131/132 can fulfill various logical functions for the RAN including, but not limited to, radio network controller (RNC) functions such as radio bearer management, uplink and downlink dynamic radio resource management and data packet scheduling, and mobility management. In embodiments, the UEs 121 and IoT devices 111 can be configured to communicate using OFDM communication signals with each other or with any of the RAN nodes 131/132 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

The RAN nodes 131/132 may be configured to communicate with one another via respective interfaces or links (not shown), such as an X2 interface for LTE implementations (e.g., when CN 120 is an Evolved Packet Core (EPC)), an Xn interface for 5G or NR implementations (e.g., when CN 120 is an Fifth Generation Core (5GC)), or the like.

The ANs 131 and 132 are communicatively coupled to CN 120. In embodiments, the CN 120 may be an evolved packet core (EPC) network, a NextGen Packet Core (NPC) network, a 5G core (5GC), or some other type of CN. The CN 120 may comprise a plurality of network elements, which are configured to offer various data and telecommunications services to customers/subscribers (e.g., users of UEs 121 and IoT devices 111) who are connected to the CN 120 via a RAN. The components of the CN 120 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 120 components/functions.

The CN 120 is shown to be communicatively coupled to an application server 150 and a network 150 via an IP communications interface 155. the one or more server(s) 150 comprise one or more physical and/or virtualized systems for providing functionality (or services) to one or more clients (e.g., UEs 121 and IoT devices 111) over a network (e.g., cloud 144). The server(s) 150 may include various computer devices with rack computing architecture component(s), tower computing architecture component(s), blade computing architecture component(s), and/or the like. The server(s) 150 may represent a cluster of servers, a server farm, a cloud computing service, or other grouping or pool of servers, which may be located in one or more datacenters. The server(s) 130 may also be connected to, or otherwise associated with one or more data storage devices (not shown). Moreover, the server(s) 150 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 150 offer applications or services that use IP/network resources. As examples, the server(s) 150 may provide traffic management services, cloud analytics, content streaming services, immersive gaming experiences, social networking and/or microblogging services, and/or other like services. In addition, the various services provided by the server(s) 150 may include initiating and controlling software and/or firmware updates for applications or individual components implemented by the UEs 121 and IoT devices 111. The server(s) 150 can also be configured to support one or more communication services (e.g., Voice-over-Internet Protocol (VoIP) sessions, PTT sessions, group communication sessions, social networking services, etc.) for the UEs 121 and IoT devices 111 via the CN 120.

The cloud 144 may represent a cloud computing service, the Internet, a local area network (LAN) or a wide area network (WAN) including proprietary and/or enterprise networks for a company or organization, or combinations thereof. The cloud 144 may be a network that comprises computers, network connections among the computers, and software routines to enable communication between the computers over network connections. In this regard, the cloud 144 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 144 may be via a wired or a wireless connection using the various communication protocols discussed infra. More than one network may be involved in a communication session between the illustrated devices. Connection to the cloud 144 may require that the computers execute software routines which enable, for example, the seven layers of the OSI model of computer networking or equivalent in a wireless (cellular) phone network. Cloud 144 may be used to enable relatively long-range communication such as, for example, between the one or more server(s) 150 and one or more UEs 121 and IoT devices 111. In some embodiments, the cloud 144 may represent the Internet, one or more cellular networks, local area networks, or wide area networks including proprietary and/or enterprise networks, Transfer Control Protocol (TCP)/Internet Protocol (IP)-based network, or combinations thereof. In such embodiments, the cloud 144 may be associated with network operator who owns or controls equipment and other elements necessary to provide network-related services, such as one or more base stations or access points, one or more servers for routing digital data or telephone calls (e.g., a core network or backbone network), etc. The backbone links 155 may include any number of wired or wireless technologies, and may be part of a local area network (LAN), a wide area network (WAN), or the Internet. In one example, the backbone links 155 are fiber backbone links that couple lower levels of service providers to the Internet, such as the CN 142 and cloud 144.

In some embodiments, at least some of the edge nodes 120 may include or be part of a MEC system 135. The MEC system 135 includes a collection of MEC servers 136 (including MEC server 136a and MEC server 136b in FIG. 1) and MEC management systems (not shown by FIG. 1) necessary to run MEC applications (e.g., MEAs 1036 of FIG. 10 and MEAs 1136 of FIG. 11) within an operator network or a subset of an operator network. The MEC servers 136a, 136b, 136c (collectively referred to as "MEC servers 136" or "MEC server 136") are physical computer systems (e.g., server compute nodes) that include a MEC platform (e.g., MEP 1037 of FIG. 10 and MEP-VNF 1137 of FIG. 11) and a virtualization infrastructure (e.g., VI 1038 of FIG. 10 and/or NEVI 1104 of FIG. 11), and provide compute, storage, and network resources to MEC applications. The MEC servers 136 may also be referred to as "MEC hosts 136" or "edge servers." The virtualization infrastructure (VI) of the MEC servers 136 provide virtualized environments and virtualized resources (e.g., "virtualized infrastructure") for the MEC hosts 136, and the MEC applications may run as virtual machines (VMs) and/or application containers on top of the VI. The components and/or entities of the MEC system 135 are discussed in more detail infra with respect to FIGS. 10-11.

As shown by FIG. 1, each of the (R)AN nodes 131/132 and AP 133 are co-located with MEC servers 136a, 136b, and 136c, respectively. These implementations may be small-cell clouds (SCCs) where a MEC server 136 is co-located with a small cell (e.g., pico-cell, femto-cell, etc.), or may be mobile micro clouds (MCCs) where a MEC server 136 is co-located with a macro-cell (e.g., an eNB, gNB, etc.). The MEC servers 136 may be deployed in a multitude of arrangements other than as shown by FIG. 1. In a first example, the MEC servers 136 may be co-located or operated by RNCs, which may be the case for legacy network deployments, such as 3G networks. In a second example, the MEC servers 136 may be deployed at cell aggregation sites or at multi-RAT aggregation points that can be located either within an enterprise or used in public coverage areas. In a third example, the MEC servers 136 may be deployed at the edge of CN 120. These implementations may be used in follow-me clouds (FMC), where cloud services running at distributed data centers follow the UEs 121 as they roam throughout the network.

According to various embodiments, task offloading may be "opportunistic", wherein the MEC system 135 (or a particular MEC server 136 selected as the master node in the example of FIG. 1) may offload application tasks to one or more UEs 121 taking into account the computational complexity of the tasks and/or the amount of computational and network/signaling resources available at the UEs 121. For example, a MEC server 136 may offload a certain number and/or type of tasks based on the quality or strength of links 103, 105, and/or 107, the strength or quality of the computational resources available at the UEs 121, an amount of available memory or a current memory utilization of the UEs 121, and/or based on other operational parameters of (or experienced by) the UEs 121. For some identified tasks, the MEC system 135 may evaluate the offloading opportunity (e.g., the "tradeoff") with respect to available UEs 121, in which case the MEC system 135 may offload tasks to certain UEs 121 that are capable of providing output data from performing their respective tasks back to the MEC server 136 in a desired period of time. Based on the operational parameters discussed previously, offloading tradeoffs may be evaluated and optimal or best offloading opportunities may be determined based on the tradeoffs.

Figure 2:
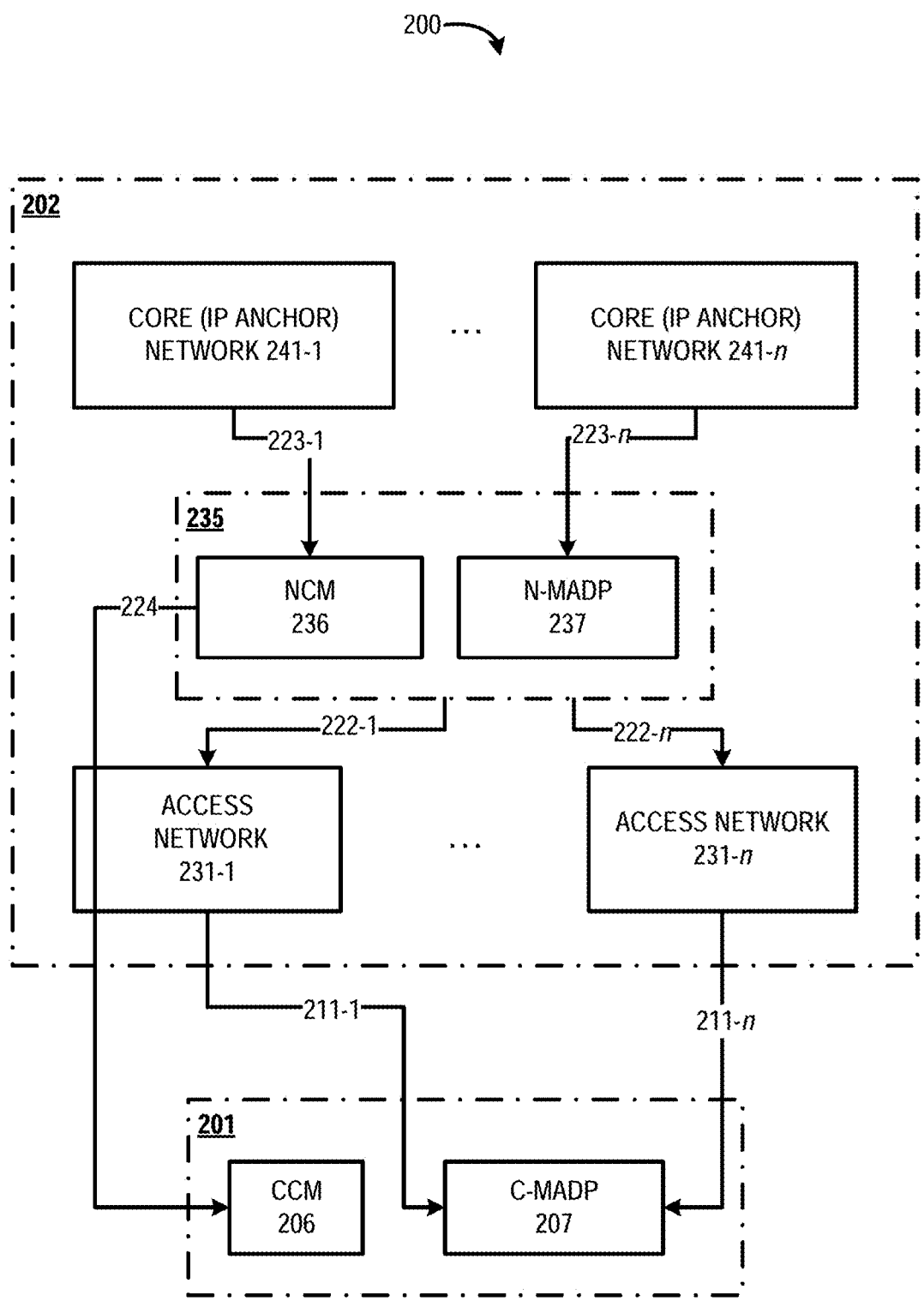
FIG. 2 depicts an example of a MAMS reference architecture according to various embodiments.

FIG. 2 shows an example of a MAMS reference architecture 200 according to various embodiments. MAMS is a programmable framework that provides mechanisms for flexible selection of network paths in a multi-access communication environment, based on application needs. MAMS leverages network intelligence and policies to dynamically adapt traffic distribution across selected paths and user plane treatment to changing network/link conditions. The network path selection and configuration messages are carried as user plane data between the functional elements in the network and the end-user device, and thus without any impact to the control plane signaling schemes of the underlying access network(s). For example, in a multi-access network with LTE and WiFi technologies, existing LTE and existing WiFi signaling procedures will be used to setup the LTE and WiFi connections, respectively, and MAMS specific control plane messages are carried as LTE or WiFi user plane data. The MAMS framework provides the capabilities of smart selection and flexible combination of access paths and core network paths, as well as the user plane treatment when the traffic is distributed across the selected paths. Thus, it is a broad programmable framework providing functions beyond simple sharing of network policies such as provided by Access Network Discovery and Selection Function (ANDSF) that offers policies and rules for assisting 3GPP devices to discover and select available access networks. Further, it allows the choice and configuration of user plane treatment for the traffic over the multiple paths, depending on the needs of the application.

MAMS mechanisms are not dependent on any specific access network type or user plane protocols like TCP, UDP, GRE, MPTCP etc. MAMS co-exists and complements the existing protocols by providing a way to negotiate and configure these protocols based on client and network capabilities per access basis to match their use for a given multi-access scenario. Further, it allows load balancing of the traffic flows across the selected multiple accesses and exchange of network state information to be used for network intelligence to optimize the performance of such protocols.

Continuing to refer to FIG. 2, the MAMS architecture 200 illustrates a scenario of a client 201 served by multiple (1 to n) core networks 241-1 to 241-n (where n is a number). The MAMS architecture 200 includes the following functional elements: a client 201 including a Client Connection Manager (CCM) 206 and a Client Multi Access Data Proxy (C-MADP) 207; multiple (1 to n) AN elements 231-1 to 231-n; a MAMS system 235 including a Network Connection manager (NCM) 236 and a Network Multi Access Data Proxy (N-MADP) 237; and the multiple (1 to n) core networks 241-1 to 241-n. The CCM 206 and NCM 236 handle control plane aspects, and the C-MADP 207 and N-MADP 237 handle user plane aspects.

The core networks (or simply "cores") 241-1 to 241-n are elements that anchor the client's 201 IP address used for communication with applications via the network. One or more of the cores 241-1 to 241-n may correspond to the CN 142 and/or the cloud 144 depicted by FIG. 1.

The client 201 is an end-user device (e.g., a UE such as UEs 121 and/or IoT devices 111 depicted by FIG. 1) supporting connections with multiple access nodes (e.g., edge nodes 130 in FIG. 1), possibly over different access technologies. When the client 201 is capable of handling multiple network connections, the client 201 may be referred to as a "multiconnectivity client" or the like.

The ANs 231-1 to 231-n are network elements in the network that deliver user data packets to the client 201 via respective point-to-point access links 211-1 to 211-n, which may include, for example, WiFi links (e.g., link 107 in FIG. 1), LTE or NR cellular links (e.g., links 103 in FIG. 1), digital subscriber line (DSL) connections, and/or the like. In some implementations, the point-to-point access links 211-1 to 211-n may additionally or alternatively include short-range radio links (e.g., links 105 in FIG. 1) such as, for example, Bluetooth® or BLE, IEEE 802.15.4 based protocols (e.g., 6LoWPAN, WirelessHART, MiWi, Thread, etc.), WiFi-direct, and/or the like.

The NCM 236 is an element in the network that handles MAMS control messages from the client 201 and configures distribution of data packets over the multiple available access paths 221-1 to 221-n, delivery paths 222-1 to 222-n, and/or core network paths 223-1 to 223-n, as well as user plane treatment of traffic flows. The NCM 236 handles the MAMS control plane procedures, and configures the network (N-MADP) and client (C-MADP) user plane functions such as negotiating the client 201 on the use of available access network paths 221-1 to 221-n, protocols and rules for processing user plane traffic, and/or link monitoring procedures. The control plane messages exchanged between the NCM 236 and CCM 206 are transported as an overlay, without any impact to the underlying access networks. The control plane path 224 may be overlaid over any access user plane path. A "path" may be a UDP flow between two hosts, which may be denoted by a 4-tuple (IP source address, IP destination address, source port, destination port). In some embodiments, WebSocket is used for transporting management and control messages between the NCM 236 and CCM 206, wherein Multi Access (MX) Control Message are carried over (or encapsulated in) a WebSocket, and the WebSocket is carried over (or encapsulated in) TCP/TLS.

The CCM 206 is an entity in the client 201 that exchanges MAMS signaling with the NCM 236 and configures the multiple network paths 221-1 to 221-n at the client 201 for transport of user data. The CCM 206 is the peer functional element of the NCM 236 in the client 201 for handling MAMS control plane procedures. The CCM 206 manages multiple network connections 221-1 to 221-n at the client 201. The CCM 206 is responsible for exchanging MAMS signaling messages with the NCM 236 for supporting functions such as uplink (UL) and downlink (DL) user network path configuration for transporting user data packets, link probing and reporting to support adaptive network path selection by NCM 236. In the DL for user data received by the client 201, the CCM 206 configures C-MADP 207 such that application data packet received over any of the accesses to reach the appropriate application on the client 201. In the UL for the data transmitted by the client 201, the CCM 206 configures the C-MADP 207 to determine the best access links 221 to be used for UL data based on a combination of local policy and network policy delivered by the NCM 236 over link 224.

The C-MADP 207 is an element in the client 201 that handles user data traffic forwarding across multiple network paths. The C-MADP 207 is responsible for MAMS-specific user plane functionalities in the client 201 such as encapsulation, fragmentation, concatenation, reordering, retransmissions, etc. The C-MADP 207 is configured by the CCM 206 based on signaling exchange with the NCM 236 and local policies at the client 201. The CCM 206 configures the selection of delivery connections 222-1 to 222-n and the user plane protocols to be used for UL user data traffic based on the signaling exchanged with the NCM 236.

The N-MADP 237 is an entity in the network handles the user data traffic forwarding across multiple network paths. N-MADP 237 is responsible for MAMS-specific user plane ("u-plane") functionalities in the network. Such as encapsulation, fragmentation, concatenation, reordering, retransmission, etc. The N-MADP 237 is the distribution node that routes the UL user plane traffic to the appropriate anchor connection 223-1 to 223-n towards a respective core network 241-1 to 241-n, and the DL user traffic to the client 201 over the appropriate delivery connection(s) 222-1 to 222-n. The anchor connections 223-1 to 223-n are network paths from the N-MADP 237 to the user plane gateway (IP anchor) that has assigned an IP address to the client 201, and the delivery connections 222-1 to 222-n are network paths from the N-MADP 237 to the client 201.

In the DL, the NCM 236 configures the use of delivery connections, and user plane protocols at the N-MADP 237 for transporting user data traffic. The N-MADP 237 may implement Equal-Cost Multi-Path routing (ECMP) support for the down link traffic. Additionally or alternatively, the N-MADP 237 may be connected to a router or other like network element (e.g., AP 106 of FIG. 1) with ECMP functionality. The NCM 236 configures the N-MADP 237 with a load balancing algorithm based on static and/or dynamic network policies. These network policies may include assigning access and core paths for specific user data traffic type, data volume based percentage distribution, link availability and feedback information from exchange of MAMS signaling with the CCM 206 at the client 201, and/or the like. The N-MADP 237 can be configured with appropriate user plane protocols to support both per-flow and per-packet traffic distribution across the delivery connections.

In the UL, the N-MADP 237 selects the appropriate anchor connection 223-1 to 223-n over which to forward the user data traffic, received from the client 201 via one or more delivery connections 222-1 to 222-n. The forwarding rules in the UL at the N-MADP 237 are configured by the NCM 236 based on application requirements (e.g., Enterprise hosted Application flows via a WiFi anchor 241 (e.g., cloud 144 of FIG. 1), Mobile Operator hosted applications via a cellular core 241 (e.g., CN 142 of FIG. 1), and/or the like).

The NCM 236 and the N-MADP 237 can be either collocated with one another or instantiated on different network nodes. The NCM 236 can setup multiple N-MADP 237 instances in the network. The NCM 236 controls the selection of an individual N-MADP 237 instance by the client and the rules for distribution of user traffic across the N-MADP 237 instances. In this way, different N-MADP 237 instances may be used to handle different sets of clients for load balancing across clients. Additionally, the different N-MADP 237 instances may be used for different address deployment topologies (e.g., N-MADP 237 hosted at the user plane node at the access edge or in the core network, while the NCM 236 hosted at the access edge node), as well as address access network technology architecture. For example, an N-MADP 237 instance at a CN node 241 may be used to manage traffic distribution across LTE and DSL networks, and another N-MADP 237 instance at a (R)AN node 131/132 may be used to manage traffic distribution across LTE and WiFi traffic. Furthermore, a single client 201 can be configured to use multiple N-MADP 237 instances, which may be used for addressing different application requirements. For example, individual N-MADP 237 instances may be used to handle TCP and UDP transport based traffic.

The CCM 206 and NCM 236 exchange signaling messages to configure the user plane functions, C-MADP 207 and N-MADP 237, at the client and network respectively. The CCM 206 may obtain the CCM 236 credentials (FQDN or IP Address) for sending the initial discovery messages. As an example, the client 201 can obtain the NCM 236 credentials using methods like provisioning, DNS query. Once the discovery process is successful, the (initial) NCM 236 can update and assign additional NCM 236 addresses, for example, based on MCC/MNC tuple information received in the MX Discovery Message, for sending subsequent control plane messages.

The CCM 206 discovers and exchanges capabilities with the NCM. The NCM 236 provides the credentials of the N-MADP 237 end-point and negotiates the parameters for user plane with the CCM 206. CCM 206 configures C-MADP 207 to setup the user plane path (e.g., MPTCP/ UDP Proxy Connection) with the N-MADP 237 based on the credentials (e.g., (MPTCP/UDP) Proxy IP address and port, Associated Core Network Path), and the parameters exchanged with the NCM 236. Further, NCM 236 and CCM 206 exchange link status information to adapt traffic steering and user plane treatment with dynamic network conditions. The key procedures are described in details in the following sub-sections.

In embodiments, a UDP connection may be configured between the C-MADP 207 and the N-MADP 237 to exchange control messages. The control messages may be or include, for example, keep-alive, probe request (REQ)/ acknowledgement (ACK), Packet Loss Report (PLR), First Sequence Number (FSN), Coded MX SDU (CMS), Traffic Splitting Update (TSU), Traffic Splitting ACK (TSA) messages, and/or path quality estimation information. The N-MADP 237 end-point IP address and UDP port number of the UDP connection is used to identify MX control PDUs.

In various embodiments, the C-MADP 207 may send out PLR messages to report lost MX SDU, for example, during handover. In response the N-MADP 237 may retransmit the lost MX SDU to the client 201 (C-MADP 207) if/when the lost packet is found.

In various embodiments, the N-MADP 237 may send out FSN messages to indicate an oldest MX SDU in its transmission (Tx) buffer if a lost MX SDU is not found in the buffer after receiving a PLR message from C-MADP 207. In these embodiments, the C-MADP 207 only reports lost packets with an SN not smaller than the FSN.

In various embodiments, the N-MADP 237 and/or C-MADP 207 may send out a CMS message to support DL or UL packet loss recovery through network coding. In these embodiments, the N-MADP 237 and/or C-MADP 207 may use a network coding algorithm to decode lost packets using the information of non-lost packets. Examples of such network coding algorithms may include linear network coding (LNC), random LNC (RLNC) (including block based RLNC and/or sliding window RLNC), caterpillar RLNC (CRLNC), network coded TCP (CTCP), convolutional network coding (CNC), opportunistic listening and opportunistic coding, and/or other like network coding algorithms. In these embodiments, if any of the MX SDUs is/are lost, a coded MX SDU is generated by applying a network coding algorithm to multiple consecutive (uncoded) MX SDUs, and is used for fast recovery without retransmission of the lost MX SDUs. The coded MC SDU may be generated using a number of consecutive MX SDUs (N) and a coding coefficient (K), where N and K are numbers. If N=2 and K=0, then an exclusive OR (XOR) method may be used to generate the coded MX SDU from two consecutive uncoded MX SDUs.

As an example, LNC involves a MAMS transmitter (e.g., either the C-MADP 207 or the N-MADP 237) generating one or more new packets using linear combinations of earlier received packets, multiplying them by one or more coefficients. The MAMS receiver (e.g., the other one of the C-MADP 207 or N-MADP 237) receives one or more coded messages (e.g., the CMS discussed infra with respect to FIG. 5), and collects the coded messages in a matrix. The original (lost) packets can be recovered by performing, for example, Gaussian elimination on the matrix, wherein the decoded packets may correspond to the rows in reduced row echelon form.

As another example, RLNC involves the MAMS transmitter generating a coded message (e.g., the CMS discussed infra with respect to FIG. 5) based on random linear combinations of previously transmitted packets (e.g., the MX SDUs discussed infra with respect to FIG. 5) with coefficients chosen from a Galois field (GF) to create coded (redundant) symbols, where source symbols can be represented as row vectors of elements of the GF. In CRLNC, the MAMS transmitter encodes a packet using a last uncoded packet received by (or sent to) the MAMS receiver with a fixed coding rate. The coded message includes, inter alia, a header containing a sequence number and coding coefficient (s), and a packet payload containing a coded packet. The coding coefficient (a(i)) specifies how a corresponding i-th uncoded packet is included in the linear combination to form the corresponding coded packet.

The various elements depicted in the example of FIG. 2 may be implemented using a variety of different physical and/or virtualized components. In some embodiments, for example, the elements within MAMS network 202 may be implemented using one or more components of an edge node 130, such as one or more LTE or 5G RANs, or the MEC system 135 of FIG. 1. In some embodiments, the MAMS system 235 may be implemented in or by an individual RAN node, such as one or more of the RAN nodes 131/132 in FIG. 1. In one example, the MAMS system 235 is implemented as part of the layer 3 (L3) protocol stack (e.g., the Radio Resource Control (RRC) layer or the like). In another example, the MAMS system 235 is implemented as part of a layer above L3 such as the network layer (e.g., IP, UDP, GTP-U, etc.) data-plane protocol stack of the RAN node 131/132. In another example of such embodiments, the MAMS system 235 may be is implemented as a separate layer between the L3 and upper layers (see e.g., FIG. 3 discussed infra). In another example of such embodiments, the MAMS system 235 may be implemented in or by a gNB-CU of a CU/DU split architecture. In another example of such embodiments, the MAMS system 235 may be implemented in or by a vBBU pool, or a cloud RAN (C-RAN). In embodiments where a MEC framework is used, the MAMS system 235 may be implemented in or by a MEC host (or a MEC server) that is located in, or co-located with, RAN such as one or more MEC servers 136 in FIG. 1. Alternatively, the functional elements within MAMS network 202 may be implemented by one or more network functions (or as a VNF) of CN 120 in FIG. 1. For example, the N-MADP 237 may run on an S-GW or P-GW when CN 120 is an EPC, or the N-MADP 237 may run on a UPF when CN 120 is a 5GC.

Figure 3:
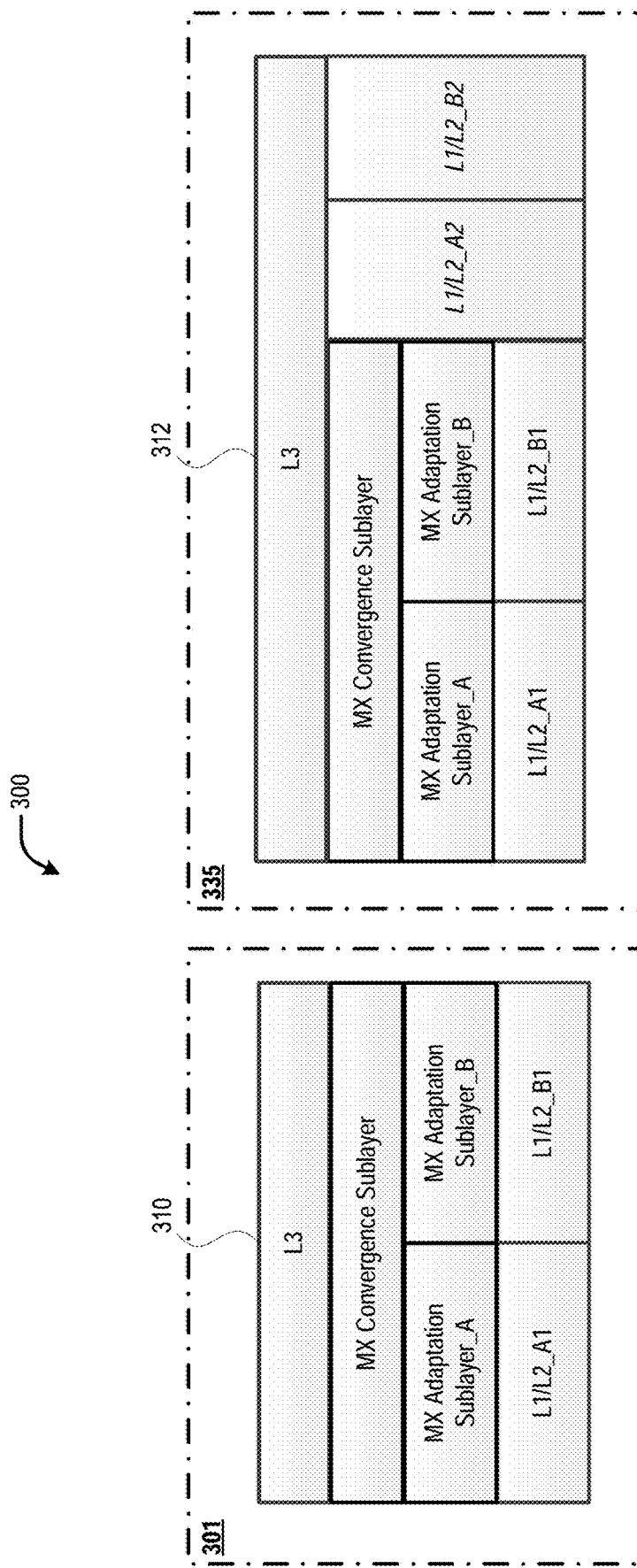
FIG. 3 depicts an example MAMS e2e user plane protocol stack according to various embodiments.

FIG. 3 depicts an example MAMS e2e user plane protocol stacks 301 and 302 in a MAMS network 300 according to various embodiments. This example includes protocol stack 310 that is implemented in a client 301 and a protocol stack 312 that is implemented in MAMS system 335. The client 301 may be the same or similar as client 202 of FIG. 2, and the MAMS system 335 may be the same or similar as the MAMS system 235 of FIG. 2.

The protocol stacks 310 and 312 may include one or more layer 3 (L3) protocols, various layer 2 (L2) and layer 1 (L1) protocols (L1/L2_A and L1/L2_B in FIG. 3) for different wireless network interfaces. The L3 protocols may be or reside in the network layer of the OSI model. The network layer is responsible for knowing the internetwork path (routing) from a source (sending) device to a destination (receiver) device. The network layer is also responsible for logical addressing schemes that assign logical addresses to network hosts on both sides of the path. L3 protocols send datagrams (or packets) to the L2 entities. The datagrams/ packets contain a defined set of data including addressing and control information that is routed between the source and destination devices. Examples of L3 protocols include, inter alia, IP, User Datagram Protocol (UDP), Internetwork Packet Exchange/Sequenced Packet Exchange (IPX/SPX), AppleTalk, DECnet, Routing Information Protocol (RIP), Interior Gateway Routing Protocol (IGRP), Enhanced IGRP (EIGRP), Open Shortest Path First (OSPF), intermediate system-to-intermediate system (IS-IS), Border Gateway Protocol (BGP), and Exterior Gateway Protocol (EGP). In an example, when L3 is an IP layer, the L3 may assign IP addresses to user data packets in any of IPv4, IPv6, or PPP formats, for example. In 3GPP-based networks (e.g., LTE, NR, etc.), the L3 for the control plane includes an RRC protocol/layer/entity and a Non-Access Stratum (NAS) protocol/layer/entity. Typically, the RRC layer communicates data with the L2 protocol entities via one or more service access points (SAPs) and may configure the lower layer entities via corresponding management SAPs (M-SAPs).

The L2 protocols may be or reside in the data link layer of the OSI model. The data link layer is responsible for reliable transmission of data across a physical network link, using specifications that provide different network and protocol characteristics, which includes physical addressing, different network topologies, error notifications, frame (L2 data units) sequences, and frame flow control. L2 is concerned with a specific addressing structure, namely physical addressing, as opposed to the L3 logical addressing scheme. Depending on the interface implementations, the physical addressing generally comes in the form of a MAC addresses that is encoded into the communication interface circuitry of the node. For WiFi-based protocols, the logical link control (LLC) layer may perform L3 multiplexing and demultiplexing operations. On receiving a frame from the MAC layer or the physical layer, the LLC layer identifies an L3 protocol type from an LLC header portion and provides the datagram to the correct L3 protocol via a suitable SAP ("de-multiplexing"). When sending data, the LLC layer provides packets from a particular L3 protocol entity to the MAC layer via a MAC SAP after inserting an L3 protocol type in the LLC header portion of the frame ("multiplexing"). The MAC layer of WiFi-based interfaces (e.g., IEEE 802.3) specifies a physical MAC address that identifies an interface or node on a network. Each frame (e.g., MAC PDU (MPDU)) sent over the wire contains a MAC address field, and only devices with a specific MAC address can process the frame. A source MAC address field is also included in the frame. Each interface implemented by a node has a corresponding L2 protocol stack. For example, a node 301 or 335 comprising an IEEE 802.11 based interface may include an L2 protocol stack comprising LLC and MAC layers, and the node may include a 3GPP-based interface including an L2 protocol stack comprising a Service Data Adaptation Protocol (SDAP) layer (e.g., for a 5G interface), a packet data convergence protocol (PDCP) layer, a radio link control (RLC) layer, and a MAC layer. Each of the L2 layers communicate with one another via corresponding SAPs between each layer.

In various embodiments, each protocol stacks 310 and 312 include an Multi-Access (MX) layers that are located below the L3 and above the L1/L2 entities of various communication protocols. The MX layers include an MX convergence sublayer, and for each network access technology, an MX adaptation sublayer. In embodiments, MX control PDUs and MX data PDUs goes through the MX adaptation sublayers in the same way. In these embodiments, the MX convergence sublayer is configured to communicate with one or more L3 protocols via the respective SAPs of the L3 protocols/layers, and each MX adaptation sublayer is configured to communication with a respective L2 protocol entity via the SAPs of those layers.

The MX convergence sublayer performs multi-access specific in the user plane such as access (path) selection, multi-link (path) aggregation, splitting/reordering, lossless switching, fragmentation, concatenation, keep-alive, and probing, etc. MX Convergence layer can be implemented using existing user plane protocols including, for example, TCP, Multipath TCP (MPTCP), Quick UDP Internet Connection (QUIC), Multi-Path QUIC (MPQUIC), or by adapting encapsulating header/trailer schemes such as Generic Routing and Encapsulation (GRE), Generic Multi-Access (GMA), and/or the like.

In embodiments where the MX convergence sublayer is an MPTCP-based MX convergence sublayer, multiple access networks are combined into a single MPTCP connection, and therefore, no new u-plane protocol or PDU format is needed. In these embodiments, if the NCM 236 determines that N-MADP 237 is to be instantiated with MPTCP as the MX Convergence Protocol, the NCM 236 exchanges the support of MPTCP capability in the discovery and capability exchange procedures. MPTCP proxy may be used to manage traffic steering and aggregation over multiple delivery connections.

In embodiments where the MX convergence sublayer is an GRE-based MX convergence sublayer, multiple access networks are combined into a single GRE connection, and therefore, no new u-plane protocol or PDU format is needed. In these embodiments, if the NCM 236 determines that the N-MADP 237 is to be instantiated with GRE as the MX Convergence Protocol, the NCM 236 exchanges the support of GRE capability in the discovery and capability exchange procedures.

The MX adaptation sublayers (including MX adaptation sublayer_A and MX adaptation sublayer_B in FIG. 3) perform functions to handle tunneling, network layer security, and network address translation (NAT). The tunneling functionality may include UDP tunneling, where the MX adaptation sublayers encapsulate user plane packets of a respective anchor connection 223 in a UDP tunnel of a delivery connection 222 between the N-MADP 237 and C-MADP 207; and/or IPsec tunneling, where the MX adaptation sublayers sends user plane packets of a respective anchor connection 223 through an IPsec tunnel of a delivery connection 222. The client 301 NAT may involve the MX adaptation sublayers changing a client IP address of user plane packet of the anchor connection 223, and sending the user plan packet over a delivery connection 222. The MX adaptation sublayers may also pass through (or forward) the user plane packets through without any change over the anchor connection 223. The MX adaptation sublayers also supports IPsec Tunneling and Datagram Transport Layer Security (DTLS) to ensure security of user plane packets over the network path. For IPsec tunneling, the MX adaptation sublayers 342 establish an IPsec tunnel between the N-MADP 237 and C-MADP 207 on the network path that is considered untrusted. DTLS is used if/when UDP tunneling is used on the network path that is considered untrusted. The client NAT mechanism may be used if a delivery connection 222 is trusted and does not involve NAT function on the path. The client NAT may provide efficiencies due to no tunneling overhead. The UDP or IPsec tunneling mechanisms may be used if a delivery connection 222 has a NAT function placed on the path.

The MX convergence sublayer operates on top of the MX adaptation sublayers in the protocol stacks 310 and 312. From the transmitter perspective, a User Payload (e.g., IP PDU) is processed by the MX convergence sublayer first, and then by an MX adaptation sublayer before being transported over a corresponding delivery connection 222 and/or access connection 221 (see e.g., FIG. 2). From the receiver perspective, an IP packet received over an access connection 221 and/or a delivery connection 222 (see e.g., FIG. 2) is processed by a corresponding MX adaptation sublayer first, and then by the MX convergence sublayer. According to various embodiments, loss detection and retransmission mechanisms are added to the MX convergence sublayer. In some embodiments, the MX convergence sublayer may be a trailer-based MX convergence sublayer that integrates multiple connections into a single e2e IP connection, and operates between L2 and L3 (e.g., the network or IP layers).

As an example, for each protocol stack 310 and 312, the L1/L2_A1 may be or include L1/L2 entities of a 3GPP-based radio interface and the L1/L2_B1 may be or include L1/L2 entities of a WiFi-based radio interface. For the control plane of the 3GPP-based radio interface, the MX adaptation sublayer_A1 may be below the RRC layer and above the PDCP layer; for the user plane of the 3GPP-based radio interface, the MX adaptation sublayer_A1 may be below an IP and/or UDP layer and above the SDAP layer in 5G systems and above the PDCP layer in LTE systems. In this example, the PHY layer (L1) may transmit and receive PHY layer signals that may be received from or transmitted to one or more other communication devices. The PHY layer signals may comprise one or more physical channels, such as those discussed herein. The PHY layer may further perform link adaptation or adaptive modulation and coding, power control, cell search (e.g., for initial synchronization and handover purposes), and other measurements used by higher layers, such as RRC. The PHY layer may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY may process requests from and provide indications to an instance of MAC via one or more PHY-SAP. According to some embodiments, requests and indications communicated via PHY-SAP may comprise one or more transport channels. Furthermore, in this example, the L1/L2_A2 implemented by the MAMS system 335 may be or include L1/L2 entities of a wired interface for communicating data with a core network, such as CN 142 of FIG. 1.

For the WiFi-based radio, the MX adaptation sublayer_B may be above the LLC layer and/or the MAC layer(s). In one example, the protocol stack 310 is, or is part of, the 6LoWPAN, ZigBee, Subnetwork Access Protocol (SNAP), or Thread protocol, each of which comprises, inter alia, physical (PHY) and MAC layers that are based on the IEEE 802.15.4 protocol for the operation of LR-WPANs. The MAC layer manages access to physical channels and network beaconing, and the PHY layer provides an interface to the physical channels, modulation and encoding of data for transmission, and demodulation and decoding of signals into data to be provided to upper layers.

In another example, the protocol stack 310 is, or is part of, the DSRC protocol comprising, inter alia, a DSRC/WAVE PHY and MAC layers that are based on the IEEE 802.11p protocol. The DSRC/WAVE PHY layer is responsible for obtaining data for transmitting over the V2X network from higher layers, as well as receiving raw data over the V2X network and providing data to upper layers. The MAC layer organizes the data packets into network frames. The MAC layer may be split into a lower DSRC/WAVE MAC layer based on IEEE 802.11p and an upper WAVE MAC layer (or a WAVE multi-channel layer) based on IEEE 1609.4. IEEE 1609 builds on IEEE 802.11p and defines one or more of the other higher layers. The LLC layer (e.g., IEEE 802.2) allows multiple network L3 protocols to communicate over the same physical link by allowing the L3 protocols to be specified in LLC fields.

In either of the aforementioned examples, the L1/L2_B2 implemented by the MAMS system 335 may be or include L1/L2 entities of a wired interface for communicating data with a WiFi-based backbone network, such as cloud 144 of FIG. 1.

Figure 4:
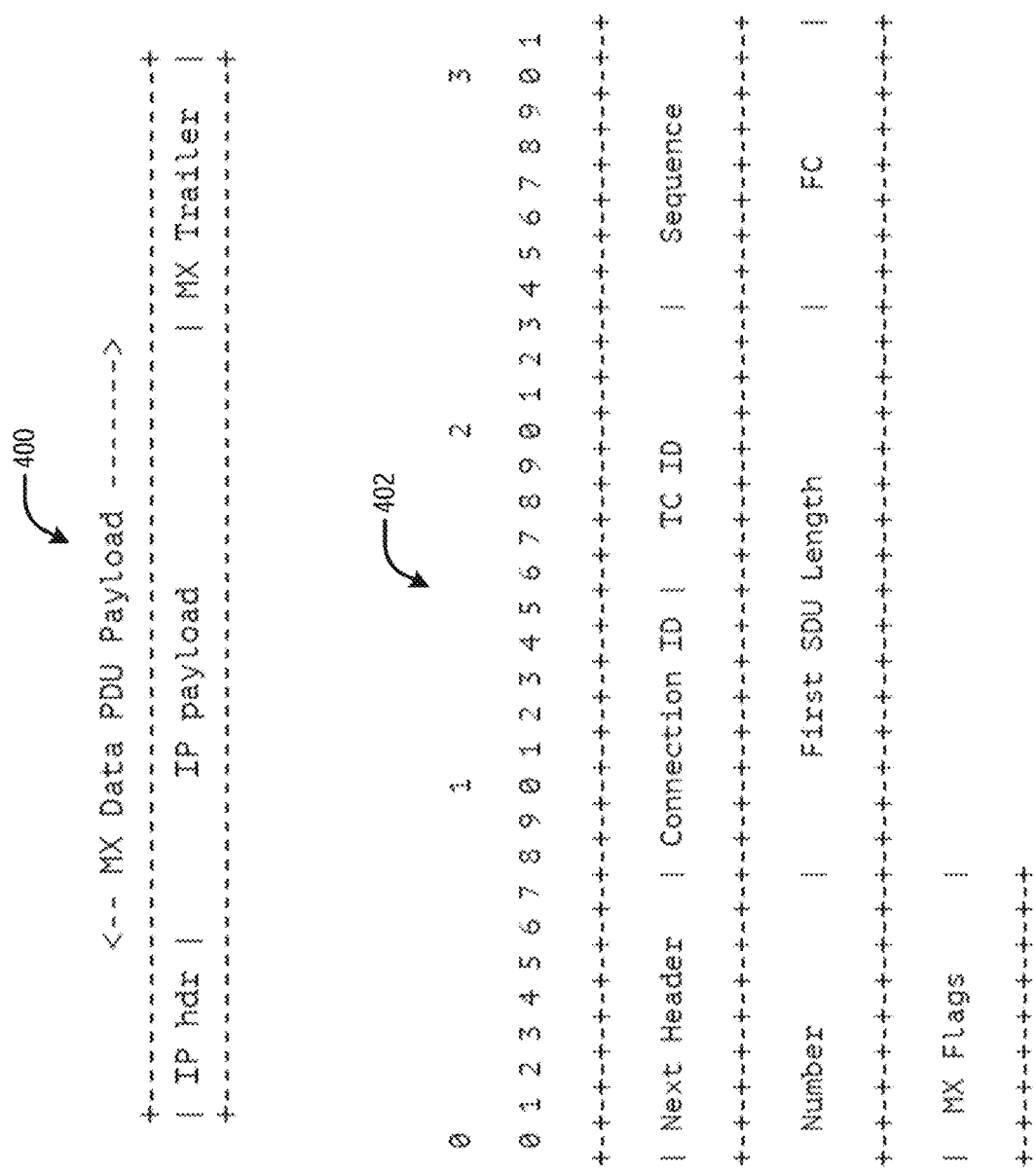
FIG. 4 depicts an example Multi-Access (MX) Data Protocol Data Unit (PDU) format and an example MX trailer format according to various embodiments.

FIG. 4 depicts an example Multi-Access (MX) Data Protocol Data Unit (PDU) format 400 and an example MX trailer format 402 according to various embodiments. The MX data PDU format 400 may carry multiple IP PDUs in the IP payload section/field if concatenation is supported, and may carry a fragment of the IP PDU if fragmentation is supported. The MX data PDU format 400 also includes an IP header (hdr) section/field and the MX trailer section to carry the trailer-based MX PDU format 402.

In some embodiments, the Protocol Type field in the IP hdr of the MX data PDU format 400 may include a value of "114" to indicate that the presence of MX trailer (e.g., the trailer based MAMS u-plane protocol is a "0-hop" protocol, not subject to IP routing). If the MX PDU is transported with the MX adaptation method of IPsec tunneling, client NAT, or Pass Through, the IP length field in the IP header of the MX data PDU format 400 may also be changed to add the length of "MX Trailer" to the length of the original IP packet, and the IP checksum field in the IP header of the MX data PDU format 400 may also be changed to recalculate after changing "Protocol Type" and "IP Length". If the MX adaptation method is UDP tunneling and "MX header optimization" in the "MX_UP_Setup_Configuration_Request" message is true, the "IP length" and "IP checksum" header fields of the MX data PDU format 400 may remain unchanged.

The MX u-plane protocol can support multiple anchor connections 223 simultaneously, each of which is uniquely identified by Connection ID. MX u-plane protocol can also support multiple traffic classes per connection, each of which is identified by Traffic Class ID. Moreover, the MX trailer format 402 may be negotiated dynamically between the NCM 236 and CCM 206 (see FIG. 2). For example, the NCM 236 can send a control message to indicate which of the above fields should be included for individual delivery connection, on DL and UL, respectively.

The trailer-based MX PDU format 402 allows in a Sequence Number (SN) to be added as part of the MX trailer to each IP packet that is sent between a MAMS receiver (e.g., endpoints 110, intermediate nodes 120 of FIG. 1) and a MAMS system (e.g., MAMS system 335 of FIG. 3). the MX trailer format with all the fields present. In some embodiments, the MX flags are encoded in the last octet of the MX Trailer at the end of a MX PDU, and the MAMS receiver may first decode the MX flags field to determine the length of the MX trailer, and then decode each MX field accordingly.

The trailer-based MX PDU format 402 includes the following fields:

MX flags (e.g., 1 Byte): bit 0 is the most significant bit, bit 7 is the least significant bit, bits 6 and 7 are reserved for future uses.

Next Header Present (bit 0): If the Next Header Present bit is set to 1, then the Next Header field is present and contains valid information.

Connection ID Present (bit 1): If the Connection ID Present bit is set to 1, then the Connection ID field is present and contains valid information.

Traffic Class Present (bit 2): If the Traffic Class Present bit is set to 1, then the Traffic Class field is present and contains valid information.

Sequence Number Present (bit 3): If the Sequence Number Present bit is set to 1, then the Sequence Number field is present and contains valid information.

Packet Length Present (bit 4): If the Packet Length Present bit is set to 1, then the First SDU (Service Data Unit) Length field is present and contains valid information.

Fragmentation Control Present (bit 5): If the Fragmentation Control Present bit is set to 1, then the Fragmentation Control field is present and contains valid information.

Bit 6~7: reserved.

Next Header (e.g., 1 Byte): the IP protocol type of the (first) IP packet in a MX PDU.

Connection ID (e.g. 1 Byte): an unsigned integer to identify the anchor connection of the IP packets in a MX PDU.

Traffic Class (TC) ID (e.g., 1 Byte): an unsigned integer to identify the traffic class of the IP packets in a MX PDU, for example Data Radio Bearer (DRB) ID [LWI-PEP] for a cellular (e.g., LTE) connection.

Sequence Number (SN) (e.g., 2 Bytes): an auto-incremented integer to indicate order of transmission of the IP packet, needed for lossless switching or multi-link (path) aggregation or fragmentation. Sequence Number SHALL be generated on a per Connection and per Traffic Class (TC) basis.

First SDU Length (e.g., 2 Bytes): the length of the first IP packet, only included if a MX PDU contains multiple IP packets, e.g., concatenation.

Fragmentation Control (FC) (e.g., 1 Byte): to provide necessary information for re-assembly, only needed if a MX PDU carries fragments, i.e. fragmentation.

According to various embodiments, packet loss detection may be supported based on the SN without changes to the existing MAMS protocols. However, protocol enhancements may be needed to the MX convergence sublayer to support the retransmission mechanisms discussed herein. In various embodiments, MX control messages may be used for such purposes including the following MX control messages.

NACK report: reports the list of lost packets at receiver, and includes the following information: (Anchor) Connection ID; Traffic Class ID; and Number of Packet Loss Bursts (1 Byte). For each burst {SN of the first lost packet in the burst (2 Bytes), Number of lost packets in the burst (1 Byte or 2 Bytes)}.

ACK report: reports the last received in-order packet at receiver, and includes the following information: (Anchor) Connection ID; Traffic Class ID; and Sequence Number (SN) of the last received in-order packet (2 Bytes).

FSN (First Sequence Number) report: reports the SN of the oldest (unacknowledged) packet in the buffer at transmitter, and includes the following information: (Anchor) Connection ID; Traffic Class ID; and SN of the oldest (unacknowledged) packet in the buffer at transmitter.

In these embodiments, the NACK report and ACK report are sent by a MAMS receiver (e.g., client 201 and client 301 of FIGS. 2 and 3, respectively), and the FSN report is sent by the MAMS transmitter (e.g., MAMS system 235 and MAMS system 335 of FIGS. 2 and 3, respectively). It is implementation specific how to detect packet loss and send out NACK report. Usually, the MAMS receiver will send out a NACK report once a packet loss is detected. Moreover, a minimal NACK report time interval (7) may be inserted between two successive NACK reports to avoid unnecessary retransmission. The minimum NACK report time interval may be configured by the MAMS transmitter through the MX control messages.

When the MAMS transmitter receives a NACK report, but cannot find the lost packet in its Tx buffer, the MAMS transmitter may send the FSN report to the MAMS receiver to notify the MAMS receiver of the SN of the oldest (e.g., acknowledged) packet in the Tx buffer. In response, the MAMS receiver does not report any lost packets whose SN is smaller (e.g., older) than the FSN.

In some embodiment, the NACK report discussed above may be a PLR message, which is used to report lost MX SDUs/PDUs. The contents of the PLR message is discussed infra. In either of the aforementioned embodiments, the (Anchor) Connection ID may be an unsigned integer to identify the anchor connection which the ACK message is for; the Traffic Class ID may be an unsigned integer to identify the traffic class of the anchor connection which the ACK message is for; the ACK number may be the next (in-order) SN that the sender of the PLR message is expecting; and for each loss burst, the Number of Loss Bursts may include or indicate the SN of the first lost MX SDU in a burst, and the number of consecutive lost MX SDUs in the burst.

Figure 5:
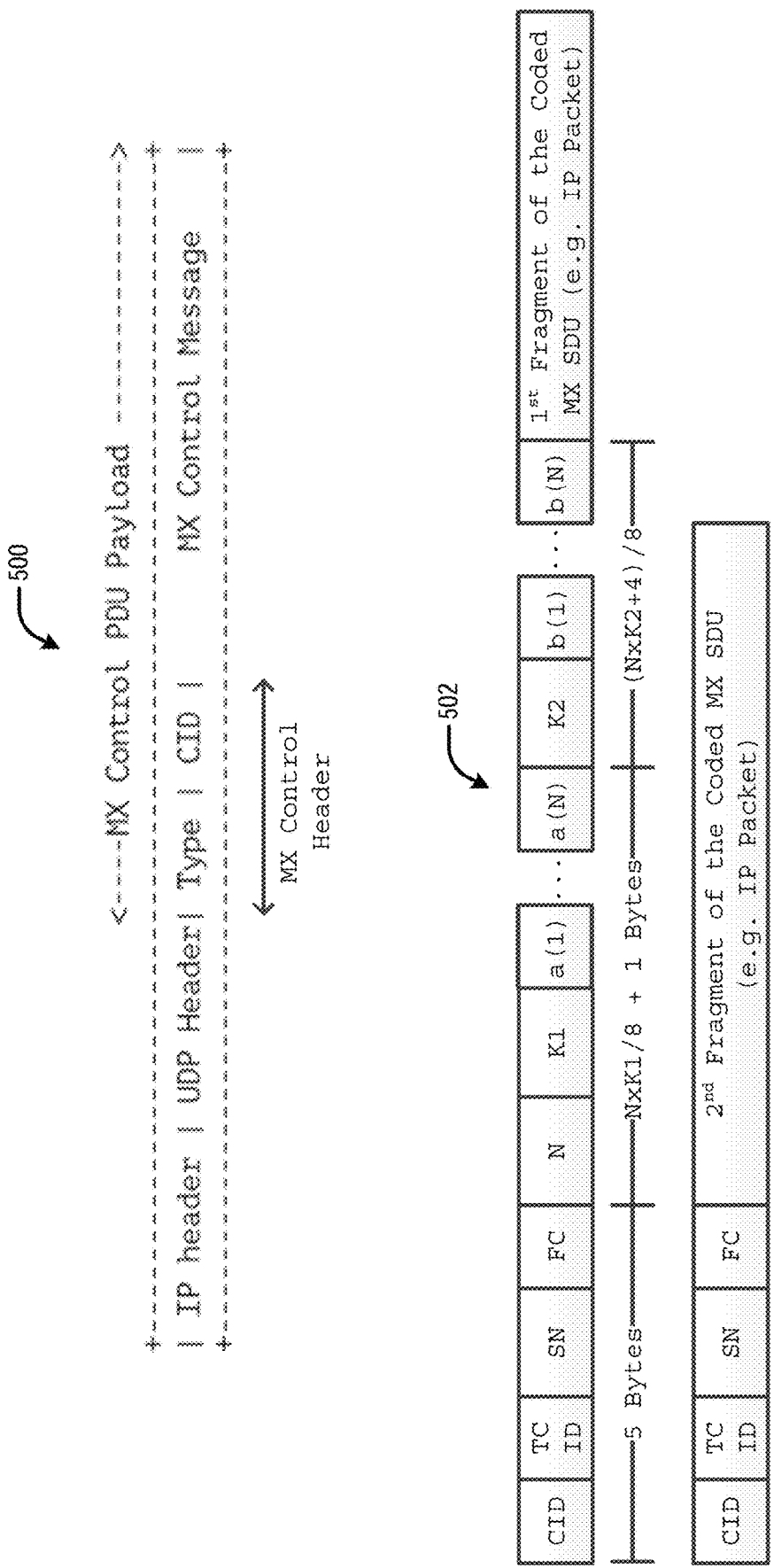
FIG. 5 depicts an example MX Control PDU format and an example coded MX Service Data Unit (SDU) format according to various embodiments.

In various embodiments, a new type of MX control message may be used to deliver coded MX service data units (SDUs). Examples of the MX control messages and MX SDUs is shown by FIG. 5. The coded MX SDU may be generated by applying the network coding technique to one or multiple consecutive MX SDUs. The receiver may use the Coded MX SDU to recover any of the MX SDUs that are used in the coding. For example, packet A and packet B are two MX SDUs, and a packet C may be generated by simply applying XOR between the two. As a result, if packet A is lost, packet A may be obtained by B⊕C. Similarly, if packet B is lost, packet B may be obtained by A⊕C.

FIG. 5 depicts an example MX control PDU format 500 and an example coded MX Service Data Unit (SDU) format 502 according to various embodiments. The MX control PDU format 500 includes an MX control PDU payload, an IP header, and a UDP header.

Control PDUs are sent as UDP messages between the C-MADP 207 and the N-MADP 237 to exchange control messages for keep-alive, path quality estimation, or other like purposes. A UDP connection may be configured between the C-MADP 207 and the N-MADP 237 for the exchange the control messages. An N-MADP 237 end-point IP address and a UDP port number of the UDP connection is/are used to identify an MX control PDU. An N-MADP 237 end-point IP address may be included in the IP header section and a UDP port number of the UDP connection may be included in the UDP header section. MX Probe Parameters are negotiated during the User Plane Setup phase (e.g., MX UP SETUP CFG and MX UP SETUP CNF).

The MX control PDU payload includes the following fields:

Type (1 Byte): the type of the MX control message. The Type field may include the following values:
+0: Keep-Alive
+1: Probe REQ/ACK
+2: Packet Loss Report (PLR)
+3: First Sequence Number (FSN)
+4: Coded MX SDU (CMS)
+5: Traffic Splitting Update (TSU)
+6: Traffic Splitting Acknowledgement (TSA)
+Others: reserved Connection ID (CID) (1 Byte): the connection ID of the delivery connection for sending out the MX control message MX Control Message (variable): the payload of the MX control message The type field and CID fields may comprise an MX control header.

In some embodiments, the "Type" field is set to "2" for a PLR message. A PLR message includes the following fields:
Connection ID (1 Byte): an unsigned integer to identify the anchor connection which the ACK message is for;
Traffic Class ID (1 Byte): an unsigned integer to identify the traffic class of the anchor connection which the ACK message is for;
ACK number (2 Bytes): the next (in-order) SN that the sender of the PLR message is expecting; and
Number of Loss Bursts (1 Byte): for each loss burst, include the following:
SN of the first lost MX SDU in a burst (2 Bytes), and
Number of consecutive lost MX SDUs in the burst (1 Byte).

In some embodiments, the "Type" field is set to "3" for an FSN message. An FSN message includes the following fields:
Connection ID (1 Byte): an unsigned integer to identify the anchor connection which the FSN message is for;
Traffic Class ID (1 Byte): an unsigned integer to identify the traffic class of the anchor connection which the FSN message is for; and
First Sequence Number (2 Bytes): the SN of the oldest MX SDU in the (retransmission) buffer of the sender of the FSN message.

In some embodiments, the "Type" field is set to "4" for a CMS message. A CMS message includes the following fields:
Connection ID (1 Byte): an unsigned integer to identify the anchor connection of the coded MX SDU;
Traffic Class ID (1 Byte): an unsigned integer to identify the traffic class of the coded MX SDU; and
Sequence Number (2 Bytes): the SN of the first (uncoded) MX SDU used to generate the coded MX SDU;
Fragmentation Control (FC) (1 Byte): to provide necessary information for re-assembly, only needed if the coded MX SDU is too long to transport in a single MX control PDU.
N (1 Byte): the number of consecutive MX SDUs used to generate the coded MX SDU
K (1 Byte): the length (in terms of bits) of the coding coefficient field
Coding Coefficient (N×K/8 Bytes):
a(i): the coding coefficient of the i-th (uncoded) MX SDU
padding
Coded MX SDU (variable): the coded MX SDU.

If N=2 and K=0, the simple XOR method is used to generate the Coded MX SDU from two consecutive uncoded MX SDUs, and the a(i) fields are not included in the message.

If the coded MX SDU is too long, it can be fragmented, and transported by multiple MX control PDUs. The N, K, and a(i) fields are only included in the MX PDU carrying the first fragment of the coded MX SDU.

FIG. 5 also shows an example coded MX SDU 502 of an example MX Convergence Control message format. In embodiments, the coded MX SDU 502 may be included in the MX Control Message section of the MX control PDU format 500. In this example, the CID, TC ID, SN, and FC fields are the same as discussed previously with respect to the MX trailer of FIG. 4 and/or the MX control PDU format 500. Here, the SN field includes the sequence number of the first MX SDU of the MX SDUs used to generate the coded MX SDU carried in the MX control message. In this example, the coded MX SDU 502 includes the following new fields to support packet coding:
N: the number (e.g., up to 16) of (consecutive, uncoded) MX SDUs used to generate the coded MX SDU
K1: the number (e.g., up to 16) of bits of the coding coefficient
K2: the number of bits for the coding sequence number
a(i): the coding coefficient for the i-th MX SDU ($1 \leq i \leq N$)
b(i): the coding sequence number for the i-th MX SDU ($1 \leq i \leq N$)

In embodiments, if N=2 and K1=0, an XOR coding method is used to recover the coded packet, and therefore, a(i) and/or b(i) are not included in the control message. Additionally or alternatively, if the coding sequence number is aligned with packet sequence number, then K2=0, and b(i) will not be included in the control message.

Moreover, if a coded MX SDU 502 is too long to be carried in a single MX control message, the coded MX SDU 502 may be fragmented and transported by multiple MX control messages (e.g., shown by the "$1^{st}$ Fragment . . . " and the "$2^{nd}$ Fragment . . . " in FIG. 5), and only the MX control message carrying the $1^{st}$ fragment will include the N, K1, a(i), K2, and b(i) fields.

FIGS. 6-9 show example packet recovery processes/procedures 600-900, respectively, in accordance with various embodiments. For illustrative purposes, the various operations of processes 600-900 are described as being performed by a MAMS receiver (Rx) and a MAMS transmitter (Tx). In some embodiments, the MAMS Rx may be an intermediate node 120 (e.g., a UE 121 of FIG. 1) or an endpoint 110 (e.g., an IoT device 111 of FIG. 1), and the MAMS Tx may be an edge node 130 (e.g., one or more MEC servers/hosts 136, (R)AN nodes 131/132, AP 133, relay nodes, distributed units, etc.). In other embodiments, the MAMS Tx may be the intermediate node 120 or the endpoint 110, and the MAMS Rx may be the edge node 130. Additionally, the various messages/signaling communicated between the MAMS Rx and the MAMS Tx may be sent and received over various interfaces discussed infra with respect to FIGS. 10-18, and using the various mechanisms discussed herein including those discussed infra with respect to FIGS. 10-18. While particular examples and orders of operations are illustrated FIGS. 6-9, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Figure 6:
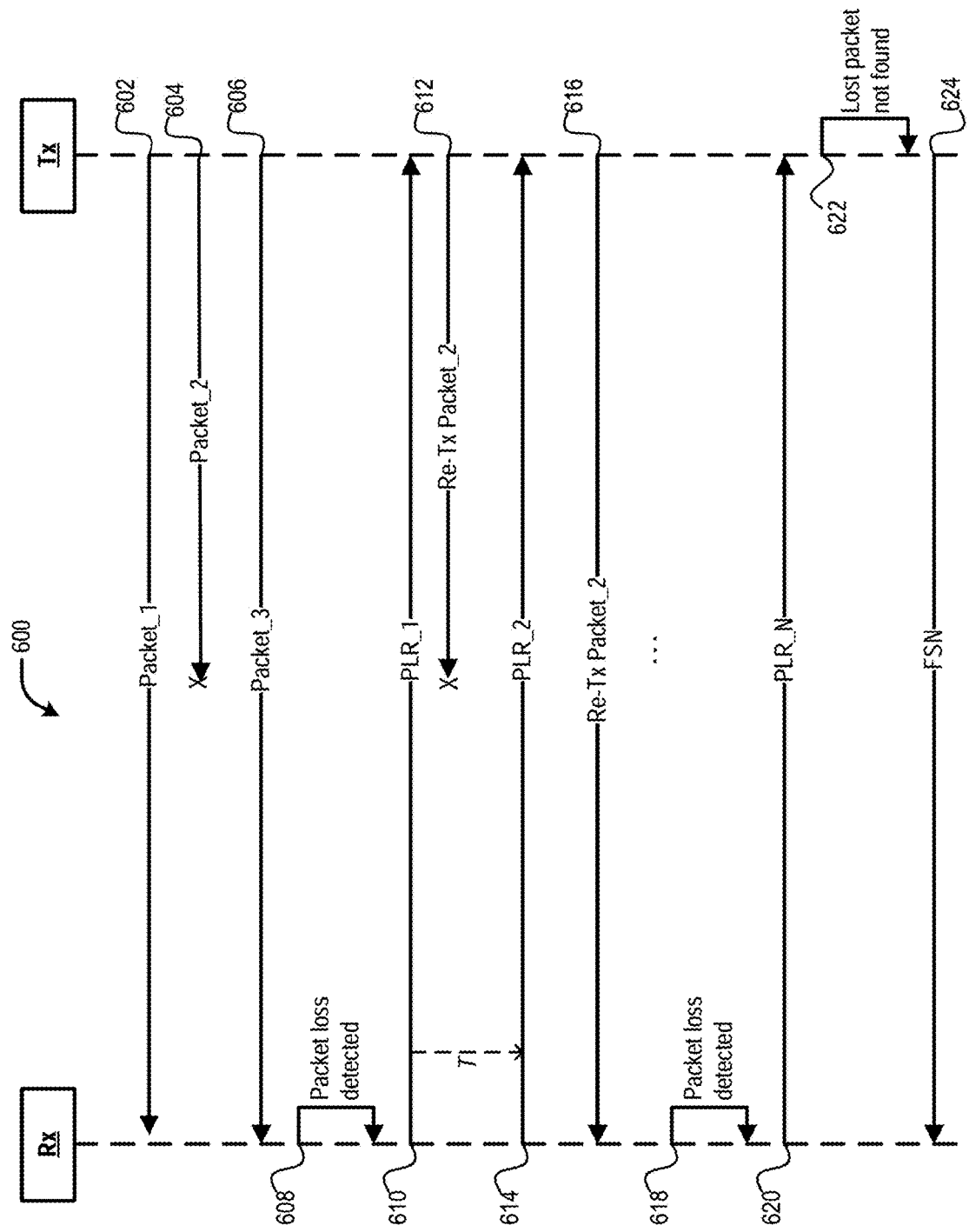
FIG. 6 depicts an example MAMS packet retransmission procedure according to various embodiments.

FIG. 6 depicts an example packet retransmission procedure 600 according to various embodiments. Procedure 600 begins at operation 602 where a first packet (Packet_1) is sent from the MAMS Tx to the MAMS Rx, and the Packet_1 is properly received by the MAMS Rx. At operation 604, a second packet (Packet_2) is sent from the MAMS Tx to the MAMS Rx, and the Packet_2 is not properly received by the MAMS Rx (i.e., Packet_2 is lost). At operation 606, a third packet (Packet_3) is sent from the MAMS Tx to the MAMS Rx, and the Packet_3 is properly received by the MAMS Rx.

At operation 608, the MAMS Rx detects the lost Packet_2, and then at operation 610, the MAMS Rx sends a first PLR (PLR_1) or a NACK report. In response, the MAMS Tx retransmits Packet_2 at operation 612, but Packet_2 is lost again. The MAMS Rx waits for the minimum report time interval (T), and then at operation 614, the MAMS Rx sends out a second PLR (PLR_2) or another NACK report). At operation 616. The MAMS Tx retransmits Packet_2, which is successfully received by the MAMS Rx.

After some time, at operation 618 the MAMS Rx detects a lost packet (Packet_N), and at operation 620, the MAMS Rx sends out a corresponding PLR (PLR_N) or NACK report. However, in this case, at operation 622 the MAMS Tx cannot find Packet_N in its Tx buffer, which causes the MAMS Tx to generate and send an FSN report at operation 624. The FSN indicates that the oldest packet in the buffer of the MAMS Tx has the SN of N+X, where X is a number. As a result, the MAMS Rx will not report any lost packets having an SN smaller than N+X.

Figure 7:
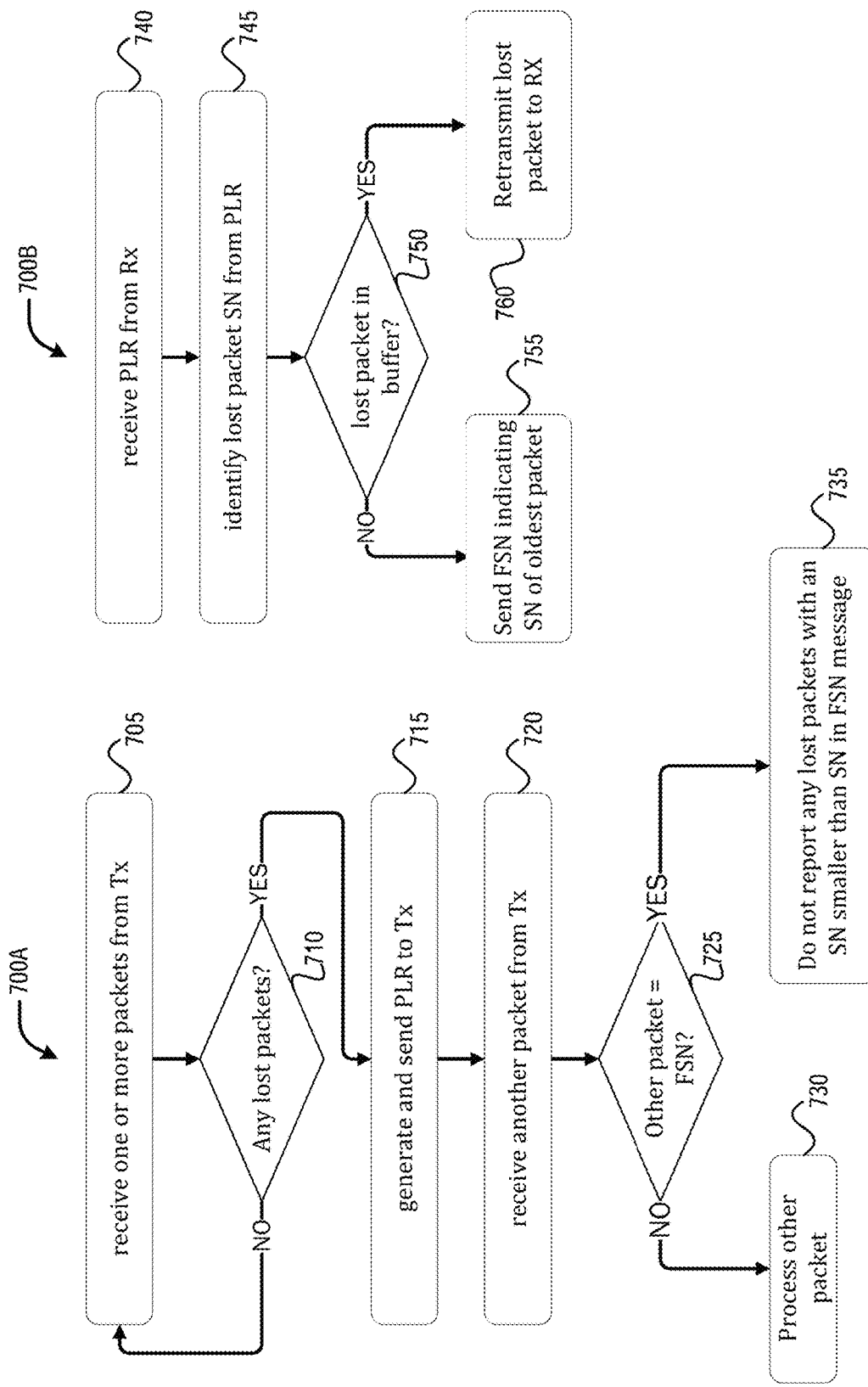
FIG. 7 depicts an example MAMS packet retransmission process according to various embodiments.

FIG. 7 depicts an example packet retransmission processes 700A and 700B according to various embodiments. Process 700A may be performed by a MAMS Rx. Process 700A begins at operation 705 where the MAMS Rx receives one or more packets from a MAMS Tx. At operation 710, the MAMS Rx determines whether any packets have been lost. If the MAMS Rx determines that no packets have been lost, the MAMS Rx loops back to continue receiving packets from the MAMS Tx. If the MAMS Rx determines that there is a lost packet, then the MAMS Rx proceeds to operation 715 to generate and send a PLR (or a NACK report) to the MAMS Tx. The PLR (or NACK report) may include the information discussed above with respect to FIGS. 4-5. At operation 720, the MAMS Rx receives another packet, and at operation 725, the MAMS Rx determines whether this other packet is an FSN or not. If the other packet is not an FSN, the MAMS Rx proceeds to operation 730 to process this packet. The other packet may be a retransmission of the lost packet or a new data packet. If the other packet is an FSN, the MAMS Rx proceeds to operation 735 to not report any lost packets with an SN that is smaller than an SN indicated by the FSN message. It is implementation specific on how the MAMS Rx will prevent PLRs from indicating the FSN. In one example, the MAMS Rx may set a suitable data element, database object, or data structure with the SN from the FSN message, and may check this entity prior to generating and sending future PLRs or NACK reports. After operation 730 or 735 is performed, process 700A may end or repeat as necessary.

Process 700B may be performed by a MAMS Tx. Process 700B begins at operation 740 where the MAMS Tx receives a PLR (or NACK report) from a MAMS Rx. The PLR (or NACK report) may include the information discussed above with respect to FIGS. 4-5. At operation 745, the MAMS Tx identifies or determines an SN of the lost packet from the information included in the PLR. At operation 750, the MAMS Tx determines whether the lost packet is in its local Tx buffer, such as by search individual packets in the buffer to determine if any of the buffered packets include the SN determined at operation 745. If the lost packet is discovered in the buffer, the MAMS Tx retransmits the lost packet at operation 760. If the lost packet is not discovered in the buffer, then at operation 755 the MAMS Tx generates and sends an FSN indicating an SN of the oldest packet in the buffer. After operation 760 or 755 is performed, process 700B may end or repeat as necessary.

Figure 8:
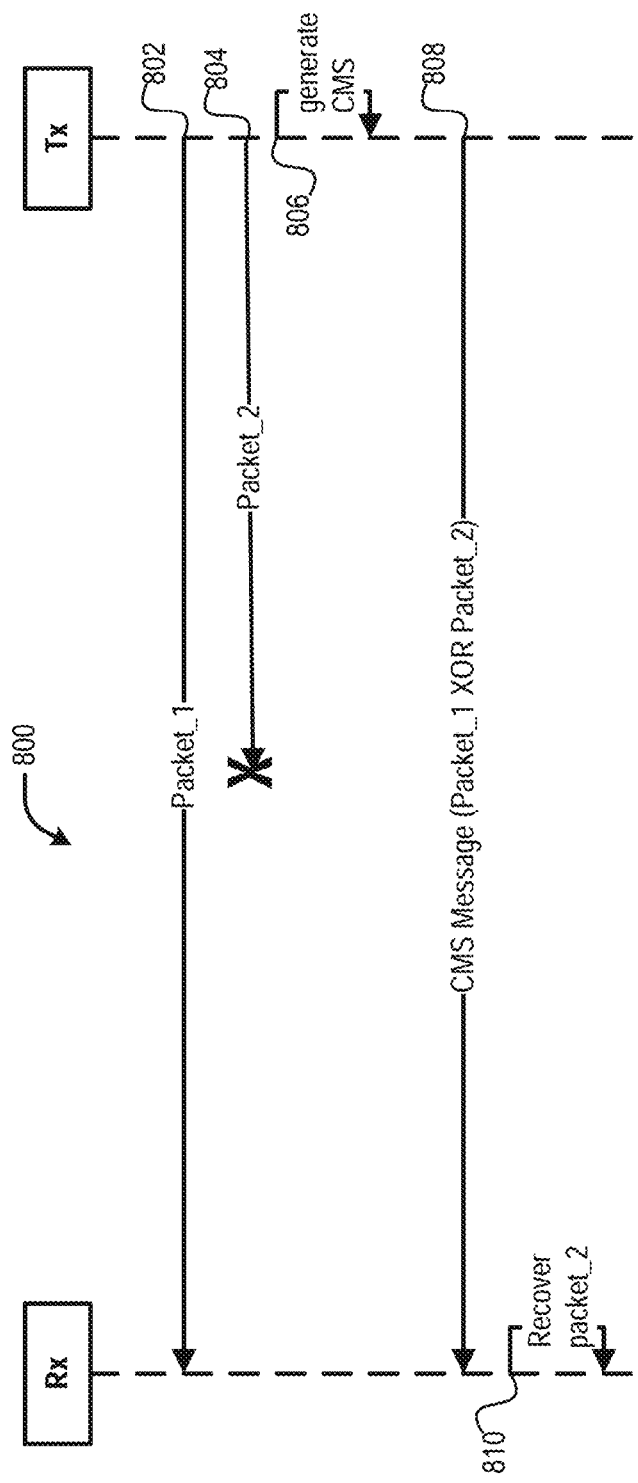
FIG. 8 depicts an example network coding-based MAMS packet loss recovery procedure according to various embodiments.

FIG. 8 depicts an example network coding procedure 800 according to various embodiments. Procedure 800 begins at operation 802 where a first packet (Packet_1) is sent from the MAMS Tx to the MAMS Rx, and the Packet_1 is properly received by the MAMS Rx. At operation 804, a second packet (Packet_2) is sent from the MAMS Tx to the MAMS Rx, and the Packet_2 is not properly received by the MAMS Rx (i.e., Packet_2 is lost). At operation 806, the MAMS Tx generates a CMS. In this example, the MAMS Tx generates the CMS by performing an XOR operation on Packet_1 and Packet_2. The CMS may also include the information as discussed previously with respect to FIGS. 4-5. In some embodiments, the MAMS Tx may send out the CMS message with or without determining a packet loss. At operation 808, the MAMS Tx sends the CMS message to the MAMS Rx. The MAMS Rx recovers the lost Packet_2 from its stored version of Packet_1 and the CMS message.

Figure 9:
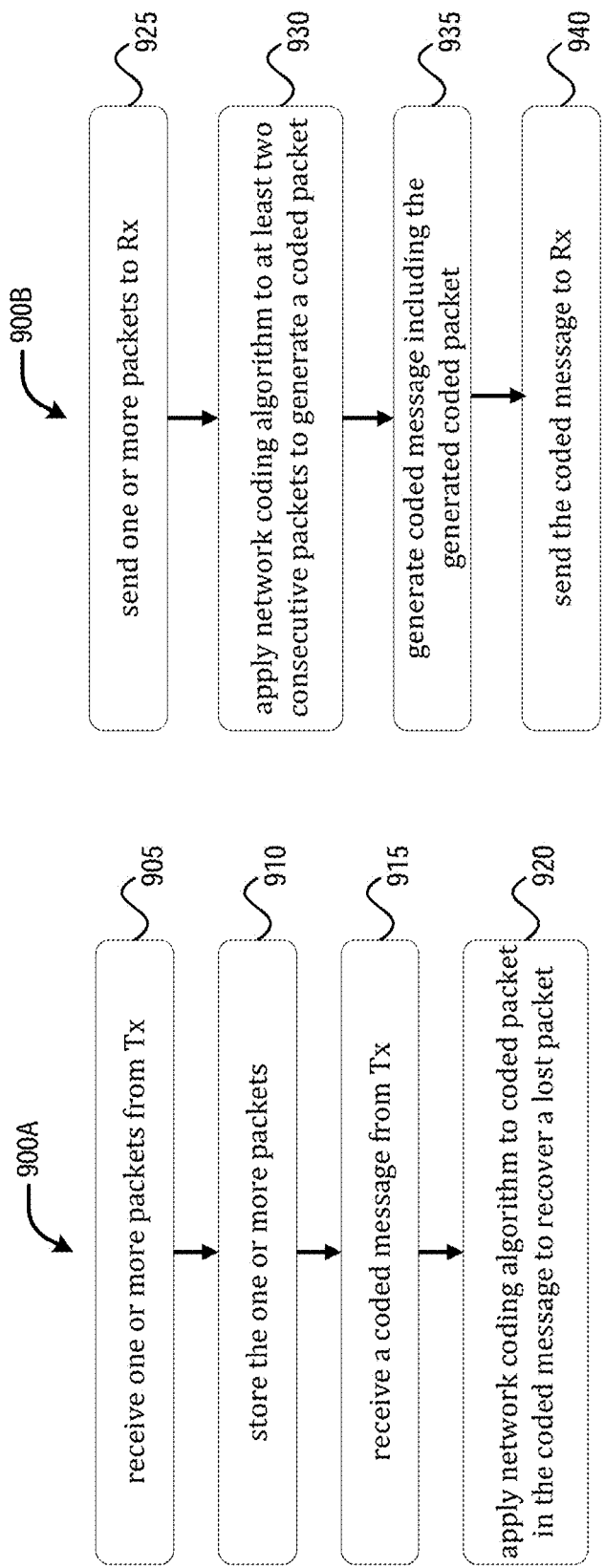
FIG. 9 depicts an example network coding-based MAMS packet loss recovery process according to various embodiments.

FIG. 9 depicts example network coding processes 900A and 900B according to various embodiments. Process 900A may be performed by a MAMS Rx. Process 900A begins at operation 905 where the MAMS Rx receives one or more packets from a MAMS Tx. At operation 910, the MAMS Rx stores the received packets. At operation 915, the MAMS Rx receives a coded message from the Tx. In embodiments, the coded message may be the CMS message discussed previously, and the CMS message may include the information discussed previously with respect to FIG. 5. At operation 920, the MAMS Rx applies a network coding algorithm to the coded packet included in the coded message to recover a lost packet. In some embodiments, coded message indicates an SN of a first uncoded packet used to generated the coded packet and a number of consecutive packets used to generate the coded packet (N). In these embodiments, the MAMS Rx may apply the network coding algorithm to the coded packet and a plurality of consecutive uncoded packets that it had stored at operation 910 to recover the missing (lost) packet. The plurality of consecutive uncoded packets is a set of consecutive packets starting from a packet with the SN of the first uncoded packet and have a number of packets equal to N. In some embodiments, the coded message also indicate a coding coefficient (a(i)) of an i-th (uncoded) uncoded packet of the plurality of packets, and a number of bits of the coding coefficient (K). In these embodiments, the MAMS Rx may perform an XOR operation on the plurality of consecutive uncoded packets when K is equal to zero. In some embodiments, the MAMS Rx may perform an XOR operation on the plurality of consecutive uncoded packets when N is equal to two and K is equal to zero. In other embodiments, the MAMS Rx may perform an XOR operation on the plurality of consecutive uncoded packets when N is m greater than two. Additionally or alternatively, the MAMS Rx may use, as the network coding algorithm, an LNC algorithm, an RLNC algorithm, a CRLNC algorithm, a CTCP algorithm, or some other suitable network coding algorithm. After operation 920 is performed, process 900A may end or repeat as necessary.

Process 900B may be performed by a MAMS Tx. Process 900B begins at operation 925 where the MAMS Tx sends one or more packets to the MAMS Rx. At operation 930, the MAMS Tx applies a network coding algorithm to at least two consecutive packets to generate a coded packet. The coded packet may be the CMS discussed previously. In some embodiments, the MAMS Tx may generate the coded packet on a periodic basis, such as after a predetermined number of packets have been sent to the MAMS Rx. For example, the MAMS Tx may send n coded CMS messages for every N (uncoded) packets, where n is a number and n may be less than, greater than, or equal to N. The particular mechanisms used to determine n and N is up to MAMS Tx implementation, and is out of scope of the present disclosure. At operation 935, the MAMS Tx generates a coded message including the coded packet. The coded message may be the CMS message discussed previously. At operation 940, the MAMS Tx sends the coded message to the MAMS Rx. After operation 940 is performed, process 900A may end or repeat as necessary.

Figure 10:
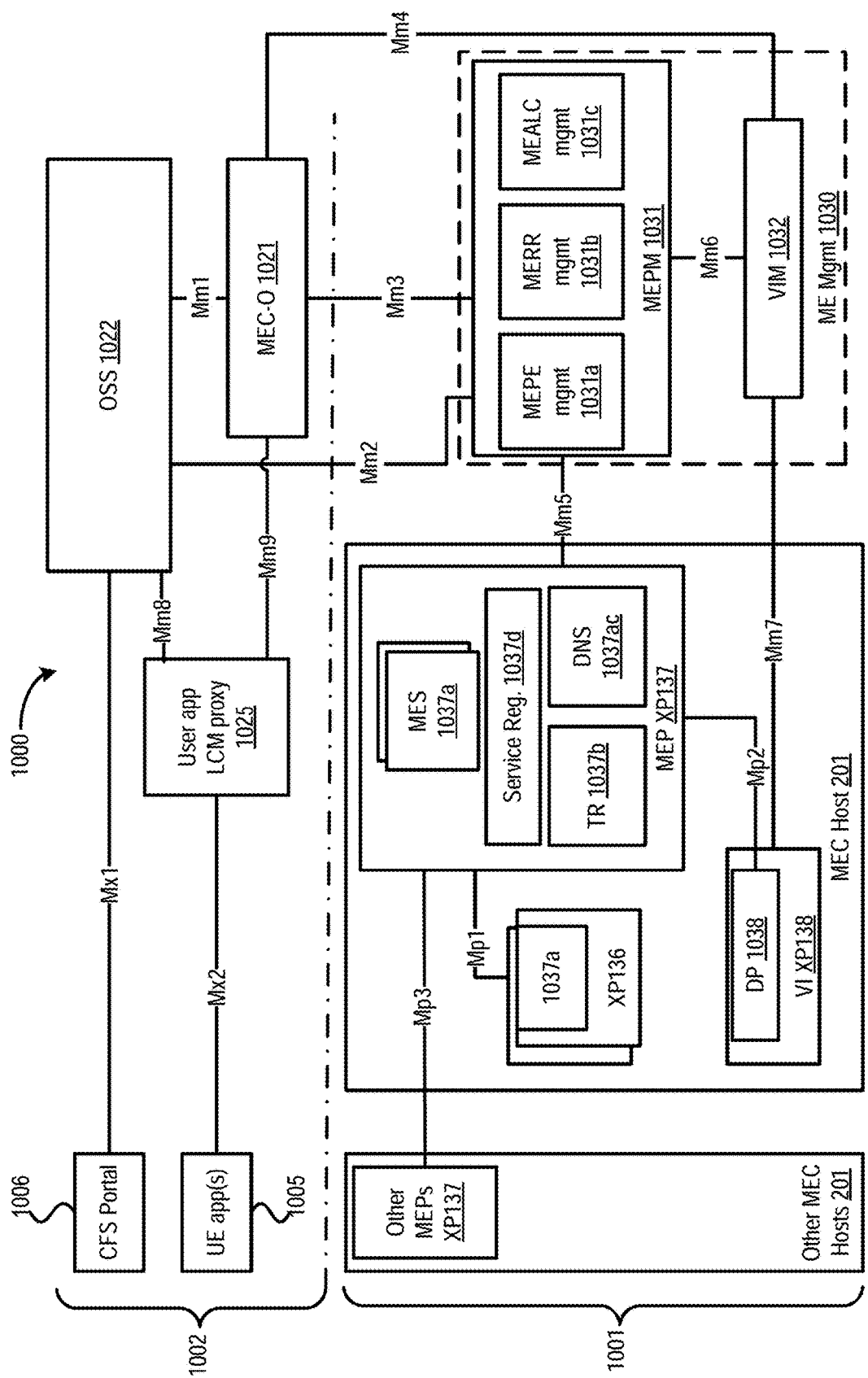
FIG. 10 depicts an example MEC system architecture according to various embodiments.

FIG. 10 illustrates an example MEC system architecture 1000 in accordance with various embodiments. The MEC system 1000 of FIG. 10 is a first embodiment of a system architecture of the MEC system 135 discussed previously. MEC enables implementation of multi-access edge applications (ME apps) 1036 as software-only entities that run on top of a Virtualization Infrastructure (VI) 1038, which is located in or close to the network edge. FIG. 10 shows the general entities involved, and these entities can be grouped into multi-access edge system level 1002, multi-access edge host level 1001, and network level entities (not shown). The multi-access edge host level 1001 includes MEC servers 136 and multi-access edge (ME) management (mgmt) 1030, which provide functionality to run multi-access edge applications (MEAs) 1036 within an operator network or a subset of an operator network. The multi-access edge system level 1002 includes multi-access edge system level management 1002, UE (which may be the same or similar to the intermediate nodes 120 and/or endpoints 110 discussed herein), and third party entities. The network level (not shown) includes various external network level entities, such as a 3GPP network (e.g., CN 120 of FIG. 1), a local area network (e.g., a LAN, WLAN, PAN, etc.), and an external network (e.g., network 150 of FIG. 1). The multi-access edge host level 1001 includes multi-access edge host level management and MEC server 136. The multi-access edge host level management may include various components that handle the management of the multi-access edge specific functionality of a particular MEP 1037, MEC server 136, and the MEAs 1036 to be run. The MEC server 136 includes the MEP 1037, MEAs 1036, and VI 1038.

The MEC system 1000 includes three groups of reference points, including "Mp" reference points regarding the multi-access edge platform functionality; "Mm" reference points, which are management reference points; and "Mx" reference points, which connect MEC entities to external entities. The interfaces/reference points in the MEC system 135 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The MEC host 136 is an entity that contains an MEP 1037 and VI 1038 which provides compute, storage, and network resources for the purpose of running MEAs 1036. The VI 1038 includes a data plane (DP) 1038 that executes the traffic rules (TR) 1037b received by the MEP 1037, and routes the traffic among applications (e.g., MEAs 1036), ME services (MESs) 1037a, DNS server/proxy (see e.g., via DNS handling entity 1037c), 3GPP network, local networks, and external networks. The MEC DP 1038a may be connected with the (R)AN nodes 111 and CN 120 of FIG. 1 over interfaces 114/115, and/or may be connected with the AP 106 of FIG. 1 via a wider network 150, such as the internet, an enterprise network, or the like. The other entities depicted by FIGS. 1-3 may be the same or similar as those discussed with regard to FIG. 10.

The MEP 1037 within the MEC server 136 may be a collection of essential functionality required to run MEAs 1036 on a particular VI 1038 and enable them to provide and consume MESs 1037a. The MEP 1037 can also provide various services and/or functions, such as offering an environment where the MEAs 1036 can discover, advertise, consume and offer MESs 1037a (discussed infra), including MESs 1037a available via other platforms when supported. The MEP 1037 may be able to allow authorized MEAs 1036 to communicate with third party servers located in external networks. The MEP 1037 may receive traffic rules from the multi-access edge platform manager (MEPM) 1031, applications, or services, and instruct the data plane accordingly (see e.g., Traffic Rules Control 1037b also referred to as filtering roles control module 1037b). The MEP 1037 may send instructions to the DP 1038 within the VI 1038 via the Mp2 reference point. The Mp2 reference point between the MEP 1037 and the DP 1038 of the VI 1038 may be used to instruct the DP 1038 on how to route traffic among applications, networks, services, etc. In some implementations, the MEP 1037 may translate tokens representing UEs XP01 in the traffic rules into specific IP addresses. The MEP 1037 also receives DNS records from the MEPM 1031 and configures a DNS proxy/server accordingly. The MEP 1037 hosts MESs 1037a including the multi-access edge services discussed infra, and provide access to persistent storage and time of day information. Furthermore, the MEP 1037 may communicate with other MEPs 1037 of other MEC servers 136 via the Mp3 reference point.

The VI 1038 may represent the totality of all hardware and software components which build up the environment in which MEAs 1036 and/or MEP 1037 are deployed, managed and executed. The VI 1038 may span across several locations, and the network providing connectivity between these locations is regarded to be part of the VI 1038. The physical hardware resources of the VI 1038 includes computing, storage and network resources that provide processing, storage and connectivity to MEAs 1036 and/or MEP 1037 through a virtualization layer (e.g., a hypervisor, virtual machine monitor (VMM), or the like). The virtualization layer may abstract and/or logically partition the physical hardware resources of the MEC server 136 as a hardware abstraction layer. The virtualization layer may also enable the software that implements the MEAs 1036 and/or MEP 1037 to use the underlying VI 1038, and may provide virtualized resources to the MEAs 1036 and/or MEP 1037, so that the MEAs 1036 and/or MEP 1037 can be executed.

The MEAs 1036 may be applications that can be instantiated on a MEC server 136 within the MEC system 135 and can potentially provide or consume MESs 1037a. MEAs 1036 may run as virtual machines (VM) on top of the VI 1038 provided by the MEC server 136, and can interact with the MEP 1037 to consume and provide the MESs 1037a. The MEAs 1036 are instantiated on the VI 1038 of the MEC server 136 based on configuration or requests validated by the ME management 730. In some embodiments, the MEAs 1036 can also interact with the MEP 1037 to perform certain support procedures related to the lifecycle of the MEAs 1036, such as indicating availability, preparing relocation of user state, etc. The MEAs 1036 may have a certain number of rules and requirements associated to them, such as required resources, maximum latency, required or useful services, etc. These requirements may be validated by the multi-access edge system level management 1030, and can be assigned to default values if missing. MESs 1037a may be services provided and consumed either by the MEP 1037 or MEAs 1036. When provided by an application, an MES 1037a can be registered in a list of services 1037d to the MEP 1037 over the Mp1 reference point. Additionally, the MEAs 1036 can subscribe to one or more services 1037a for which it is authorized over the Mp1 reference point.

The MEC system 135 may support a feature called UserApps. When the MEC system 135 supports the feature UserApps, the multi-access edge management may support the instantiation of MEAs 1036 on multiple MEC servers 136 following a single instantiation request, and when required by the operator in response to a request by the user. The application instance may need to fulfil a number of potential constraints predefined for the application. Once instantiated, connectivity may be established between the UE and the application instance. Potential constraints may include latency, location, compute resources, storage resources, network capability, security conditions, and the like.

When the MEC system 135 supports the feature UserApps, the system 1000 may, in response to a request by a user, support the establishment of connectivity between a UE and an instance of a specific MEA 1036 fulfilling the requirements of the MEA 1036 regarding the UE. If no instance of the MEA 1036 fulfilling these requirements is currently running, the multi-access edge system management may create a new instance of the application on a multi-access edge host 200 that fulfils the requirements of the application. Once instantiated, connectivity shall be established between the UE and the new MEA 1036 instance. Requirements of the application can include latency, location, compute resources, storage resources, network capability, security conditions, and the like. When the MEC system 135 supports the feature UserApps, the system 1000 may support the on-boarding of MEAs 1036 during the execution of an instantiation request, may allow the establishment of connectivity between a UE and a specific instance of an MEA 1036, may support the capability to terminate the MEA 1036 instance when no UE is connected to it anymore, and may support the termination of the MEA 1036 running on multiple MEC servers 136 following a single termination request.

As shown by FIG. 10, the Mp1 reference point is between the MEP 1037 and the MEAs 1036. The Mp1 reference point may provide service registration 1037d, service discovery, and communication support for various services, such as the MESs 1037a. In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MESs 1037a include Radio Network Information Service (RNIS), location services, and bandwidth management services. The RNIS, when available, provides authorized MEAs 1036 with radio network related information, and expose appropriate up-to-date radio network information to the MEAs 1036. The radio network information (RNI) may include, inter alia, radio network conditions, measurement and statistics information related to the user plane, information related to UEs served by the radio node(s) associated with the multi-access edge host (e.g., UE context and radio access bearers), changes on information related to UEs served by the radio node(s) associated with the multi-access edge host, and/or the like. The RNI may be provided at the relevant granularity (e.g., per UE, per cell, per period of time).

The service consumers (e.g., MEAs 1036 and MEP 1037) may communicate with the RNIS over an RNI Application Programming Interface (API) to obtain contextual information from a corresponding RAN. RNI may be provided to the service consumers via an access node (e.g., (R)AN nodes 131,132 or AP 133 of FIG. 1). The RNI API may support both query and subscription (e.g., a pub/sub) based mechanisms that are used over a Representational State Transfer (RESTful) API or over a message broker of the MEP 1037 (not shown by FIG. 10). A MEA 1036 may query information on a message broker via a transport information query procedure, wherein the transport information may be pre-provisioned to the MEA 1036 via a suitable configuration mechanism. The various messages communicated via the RNI API may be in XML, JSON, Protobuf, or some other suitable format.

The RNI may be used by MEAs 1036 and MEP 1037 to optimize the existing services and to provide new types of services that are based on up to date information on radio conditions. As an example, a MEA 1036 may use RNI to optimize current services such as video throughput guidance. In throughput guidance, a radio analytics MEA 1036 may use MEC services to provide a backend video server (e.g., server(s) 130) with a near real-time indication on the throughput estimated to be available at the radio downlink interface in a next time instant. The throughput guidance radio analytics application 1036 computes throughput guidance based on the required radio network information it obtains from a multi-access edge service running on the MEC server 136. RNI may be also used by the MEP 1037 to optimize the mobility procedures required to support service continuity, such as when a certain MEA 1036 requests a single piece of information using a simple request-response model (e.g., using RESTful mechanisms) while other MEAs 1036 subscribe to multiple different notifications regarding information changes (e.g., using a pub/sub mechanism and/or message broker mechanisms).

In various embodiments, a MEC server 136 acting as a master node for distributed ML (e.g., the MEC server 136 in the example of FIG. 1) may access RNI of individual UEs via a MEA 1036 and/or the MEP 1037 using the RNI API for the purposes of evaluating the channel conditions and/or link quality for partitioning training datasets and/or for assigning computational tasks to the individual UEs. In an example, an application implemented by a MEC entity (e.g., the MEC-O 1021) may access RNI via a MEA 1036 or the MEP 1037 using the RNI API, which may be used to select a MEC server 136 to act as the master node for the distributed ML.

The location services (LS), when available, may provide authorized MEAs 1036 with location-related information, and expose such information to the MEAs 1036. With location related information, the MEP 1037 or one or more MEAs 1036 perform active device location tracking, location-based service recommendations, and/or other like services. The LS supports the location retrieval mechanism, i.e. the location is reported only once for each location information request. The LS supports a location subscribe mechanism, for example, the location is able to be reported multiple times for each location request, periodically or based on specific events, such as location change. The location information may include, inter alia, the location of specific UEs currently served by the radio node(s) associated with the MEC server 136, information about the location of all UEs currently served by the radio node(s) associated with the MEC server 136, information about the location of a certain category of UEs currently served by the radio node(s) associated with the MEC server 136, a list of UEs in a particular location, information about the location of all radio nodes currently associated with the MEC server 136, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host or MEC server 136, or a subset thereof, according to a desired deployment. In this regard, the OMA Zonal Presence API provides means for MEAs 1036 to retrieve information about a zone, the access points associated to the zones and the users that are connected to the access points. In addition, the OMA Zonal Presence API, allows authorized application to subscribe to a notification mechanism, reporting about user activities within a zone. In various embodiments, a MEC server 136 acting as a master node for distributed ML (e.g., the MEC server 136 in the example of FIG. 1) may access location information or zonal presence information of individual UEs using the OMA Zonal Presence API to identify the relative location or positions of the UEs. The location or zonal presence information may be used as a basis for selecting individual UEs for offloading ML tasks, partitioning training data, specifying encoding criteria, or for determining other aspects of the embodiments discussed herein.

The bandwidth management services (BWMS) provides for the allocation of bandwidth to certain traffic routed to and from MEAs 1036, and specify static/dynamic up/down bandwidth resources, including bandwidth size and bandwidth priority. MEAs 1036 may use the BWMS to update/receive bandwidth information to/from the MEP 1037. In some embodiments, different MEAs 1036 running in parallel on the same MEC server 136 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism.

Figure 11:
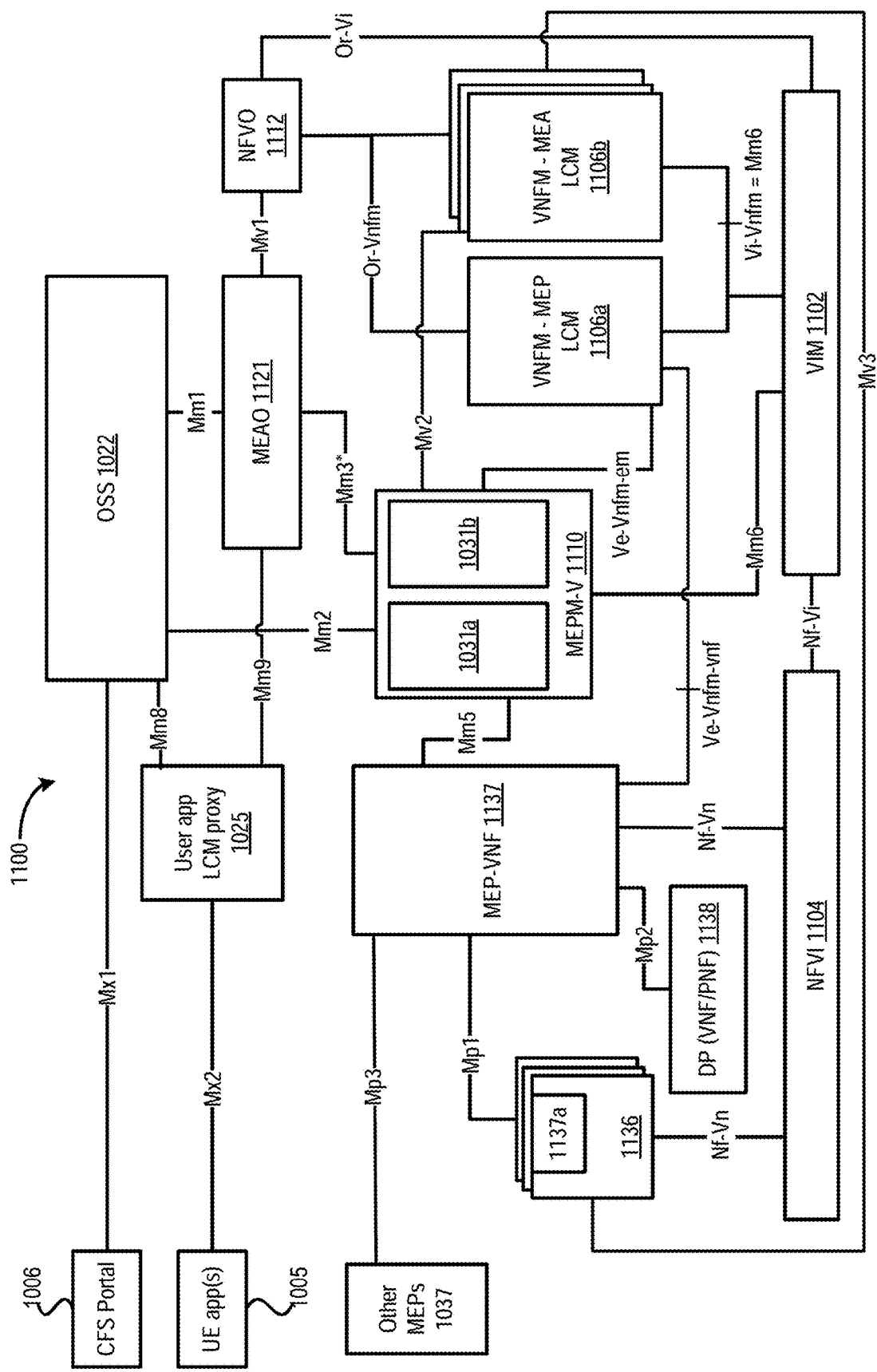
FIG. 11 depicts an example an example MEC system architecture in a Network Function Virtualization (NFV) environment according to various embodiments.

Referring back to FIG. 10, multi-access edge management comprises multi-access edge system level management and the multi-access edge host level management 1030. The multi-access edge host level management 1030 comprises the MEPM 1031 and the VI manager (VIM) 1032, and handles the management of the multi-access edge specific functionality of a particular MEC server 136 and the applications running on it. In some implementations, some or all of the multi-access edge management components may be implemented by one or more servers located in one or more data centers, and may use virtualization infrastructure that is connected with Network Functions Virtualization (NFV) infrastructure used to virtualize core network elements, or using the same hardware as the NFV infrastructure. An example NFV infrastructure is shown by FIG. 11.

The MEPM 1031 is responsible for managing the life cycle of applications including informing the multi-access edge orchestrator (MEC-O) 1021 of relevant application related events. The MEPM 1031 may also provide MEP element management functions (MEPE mgmt 1031*a*) to the MEP 1037, manage MEA rules and requirements (MERR mgmt 1031*b*) including service authorizations, traffic rules, DNS configuration and resolving conflicts, and manage MEA 1036 lifecycles (MEALC mgmt 1031). The multi-access edge platform manager 1031 may also receive virtualized resources fault reports and performance measurements from the VIM 1032 for further processing. The Mm5 reference point between the multi-access edge platform manager 1031 and the MEP 1037 is used to perform platform configuration, configuration of the MEPE mgmt 1031*a*, the MERR mgmt 1031*b*, the MEALC mgmt 1031, management of application relocation, etc.

The VIM 1032 may be an entity that allocates, manages and releases virtualized (compute, storage and networking) resources of the VI 1038, and prepares the VI 1038 to run a software image. To do so, the VIM 1032 may communicate with the VI 1038 over the Mm7 reference point between the VIM 1032 and the VI 1038. Preparing the VI 1038 may include configuring the VI 1038, and receiving/storing the software image. When supported, the VIM 1032 may provide rapid provisioning of applications, such as described in "Openstack++ for Cloudlet Deployments", available at http://reports-archive.adm.cs.cmu.edu/anon/2015/CMU-CS-15-123.pdf. The VIM 1032 may also collect and report performance and fault information about the virtualized resources, and perform application relocation when supported. For application relocation from/to external cloud environments, the VIM 1032 may interact with an external cloud manager to perform the application relocation, for example using the mechanism described in "Adaptive VM Handoff Across Cloudlets", and/or possibly through a proxy. Furthermore, the VIM 1032 may communicate with the multi-access edge platform manager 1031 via the Mm6 reference point, which may be used to manage virtualized resources, for example, to realize the application lifecycle management. Moreover, the VIM 1032 may communicate with the MEC-O 1021 via the Mm4 reference point, which may be used to manage virtualized resources of the MEC server 136, and to manage application images. Managing the virtualized resources may include tracking available resource capacity, etc.

The multi-access edge system level management includes the MEC-O 1021 as a core component, which has an overview of the complete MEC system 135. The MEC-O 1021 may maintain an overall view of the MEC system 135 based on deployed multi-access edge hosts 200, available resources, available MESs 1037*a*, and topology. The Mm3 reference point between the MEC-O 1021 and the multi-access edge platform manager 1030 may be used for the management of the application lifecycle, application rules and requirements and keeping track of available MESs 1037*a*. The MEC-O 1021 may communicate with the user application lifecycle management proxy (UALMP) 1025 via the Mm9 reference point in order to manage MEAs 1036 requested by UE application 1005.

The MEC-O 1021 may also be responsible for on-boarding of application packages, including checking the integrity and authenticity of the packages, validating application rules and requirements and if necessary adjusting them to comply with operator policies, keeping a record of on-boarded packages, and preparing the VIM(s) 1002 to handle the applications. The MEC-O 1021 may select appropriate MEC host(s) 200 for application instantiation based on constraints, such as latency, available resources, and available services. The MEC-O 1021 may also trigger application instantiation and termination, as well as trigger application relocation as needed and when supported.

The Operations Support System (OSS) 1022 refers to the OSS of an operator that receives requests via the Customer Facing Service (CFS) portal 1006 (and over the Mx1 reference point) and from UE applications 1005 for instantiation or termination of MEAs 1036, and decides on the granting of these requests. The CFS portal 1006 (and the Mx1 interface) may be used by third-parties to request the MEC system 135 to run applications 1006 in the MEC system 135. Granted requests may be forwarded to the MEC-O 1021 for further processing. When supported, the OSS 1022 also receives requests from UE applications 1005 for relocating applications between external clouds and the MEC system 135. The Mm2 reference point between the OSS 1022 and the multi-access edge platform manager 1030 is used for the multi-access edge platform 1030 configuration, fault and performance management. The Mm1 reference point between the MEC-O 1021 and the OSS 1022 is used for triggering the instantiation and the termination of multi-access edge applications 1036 in the MEC system 135.

The user application lifecycle management proxy ("user app LCM proxy") 1025 may authorize requests from UE applications 1005 in the UE and interacts with the OSS 1022 and the MEC-O 1021 for further processing of these requests. The user app LCM proxy 1025 may interact with the OSS 1022 via the Mm8 reference point, and is used to handle UE applications 1005 requests for running applications in the MEC system 135. A user application 1005 may be an ME app 1036 that is instantiated in the MEC system 135 in response to a request of a user via an application running in the intermediate nodes 120 and/or endpoints 110 (e.g., UE application 1005). The user app LCM proxy 1025 allows UE applications 1005 to request on-boarding, instantiation, termination of user applications and when supported, relocation of user applications in and out of the MEC system 135. It also allows informing the UE applications 1005 about the state of the user applications 1005. The user app LCM proxy 1025 is only accessible from within the mobile network, and may only be available when supported by the MEC system 135. A UE application 1005 may use the Mx2 reference point between the user app LCM proxy 1025 and the UE application 1005 to request the MEC system 135 to run an application in the MEC system 135, or to move an application in or out of the MEC system 135. The Mx2 reference point may only be accessible within the mobile network and may only be available when supported by the multi-access edge system.

In order to run an MEA 1036 in the MEC system 1000, the MEC-O 1021 receives requests triggered by the OSS 1022, a third-party, or a UE application 1005. In response to receipt of such requests, the MEC-O 1021 selects a MEC server 136 to host the MEA 1036 for computational offloading. These requests may include information about the application to be run, and possibly other information, such as the location where the application needs to be active, other application rules and requirements, as well as the location of the application image if it is not yet on-boarded in the MEC system 1000.

In various embodiments, the MEC-O 1021 selects one or more MEC servers 136 for computational intensive tasks. The selected one or more MEC servers 136 may offload computational tasks of a UE application 1005 based on various operational parameters, such as network capabilities and conditions, computational capabilities and conditions, application requirements, and/or other like operational parameters. The application requirements may be rules and requirements associated to/with one or more MEAs 1036, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEAs 1036 to be able to run; multi-access edge services that the MEAs 1036 can take advantage of, if available; connectivity or mobility support/requirements (e.g., application state relocation, application instance relocation); required multi-access edge features, such as VM relocation support or UE identity; required network connectivity (e.g., connectivity to applications within the multi-access edge system, connectivity to local networks, or to the Internet); information on the operator's multi-access edge system deployment or mobile network deployment (e.g., topology, cost); requirements on access to user traffic; requirements on persistent storage; traffic rules; DNS rules, etc.

The MEC-O 1021 considers the requirements and information listed above and information on the resources currently available in the MEC system 135 to select one or several MEC servers 136 within the MEC system 135 to host MEAs 1036 and/or for computational offloading. After one or more MEC servers 136 are selected, the MEC-O 1021 requests the selected MEC host(s) 200 to instantiate the application(s) or application tasks. The actual algorithm used to select the MEC servers 136 depends on the implementation, configuration, and/or operator deployment. In various embodiments, the selection algorithm may be based on the task offloading embodiments discussed herein, for example, by taking into account network, computational, and energy consumption requirements for performing tasks of application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 1021 may decide to select one or more new MEC servers 136 to act as a master node, and initiates the transfer of an application instance or application-related state information from the one or more source MEC servers 136 to the one or more target MEC servers 136.

FIG. 11 illustrates an example multi-access edge system architecture 1100 (or a multi-access edge system architecture) in accordance with various embodiments. MEC system 1100 of FIG. 11 is a second embodiment of a system architecture of the MEC system 135 discussed previously. Like numbered elements in FIG. 11 are the same as discussed previously with respect to FIG. 10. The MEC system 1100 includes architectures and infrastructures that are used to virtualize one or more network functions (NFs) onto physical resources comprising a combination of industry-standard server hardware, storage hardware, or switches, or alternatively comprising proprietary hardware. Typically, mobile network operators virtualize their NFs using Network Functions Virtualization (NFV), and use virtualization infrastructure (VI) to consolidate various network elements, which are referred to as Virtualized Network Functions (VNFs). In other words, NFV can be used to execute virtual or reconfigurable implementations of one or more components/functions of a CN 120. As mentioned previously, the MEC system 135 (or individual MEC servers 136) may include VI to consolidate and virtualize various MEC components and MEC applications on top of the VI. In this regard, the system 1100 is an architecture where MEC elements are deployed in an NFV environment, which may provide maximum utilization of the underlying VI. In particular, the system 1100 is a MEC architecture that is deployed in NFV environments, wherein the MEP 1037 is deployed as a VNF, the MEAs 1036 appear as VNFs towards the NFV MANO components (MEAs 1036 with specific NFV functionality are referred to as an "MEA-VNFs 1136" or the like), and the VI 1038 is deployed as an NFVI 1104 and its virtualized resources are managed by a VIM 1102.

In addition to elements discussed previously with respect to FIG. 10, the system 1100 is illustrated as including a virtualized infrastructure manager (VIM) 1102, a network function virtualization infrastructure (NFVI) 1104, a VNF manager (VNFM) 1106, virtualized network functions (VNFs) including, inter alia, MEPVNF 1137 and MEA-VNFs 1136, a MEC Edge Platform Manager-NFV (MEPM-V) 1110, and an NFV Orchestrator (NFVO) 1112. In embodiments, the MEP 1037 is realized as a VNF (e.g., MEP-VNF 1137 in FIG. 11) and is managed according to typical NFV procedures. In these embodiments, the MEPM 1031 is transformed into the Multi-access Edge Platform Manager-NFV (MEPM-V) 1110, where the MEPM-V 1110 acts as an Element Manager (EM) of the MEP-VNF 1137. The MEPM-V 1110 delegates Life Cycle Management (LCM) parts/tasks to one or more VNFM(s) 1106, including VNFM-MEP LCM 1106A and VNFM-MEA LCM 1106B. In particular, the VNFM 1106 is used to perform LCM of the MEP-VNF including LCM of the MEP 1037 performed by the VNFM-MEP LCM 1106A and LCM of the MEAs 1036 performed by the VNFM-MEA LCM 1106B.

Additionally, the MEC-O 1021 is transformed into a Multi-access Edge Application Orchestrator" (MEAO) 1121 that uses the NFVO 1112 for resource orchestration, and for orchestration of the set of MEA-VNFs as one or more NFV Network Services (NSs). The MEA-VNFs 1136 are managed like individual VNFs, where certain orchestration and Life Cycle Management (LCM) tasks are delegated to the NFVO 1112 and VNFM 1106a,b functional blocks. In some embodiments, the MEP-VNF 1137, the MEPM-V 1110, and VNFM-MEA LCM 1106B may be deployed as a single package or ensemble. In other embodiments, the VNFM-MEP LCM 1106A and VNFM-MEA LCM 1106B are part of a generic VNFM 1106, and the MEP-VNF 1137 and the MEPM-V 1110 are provided by a single vendor.

The VIM 1102 manages the resources of the NFVI 1104. The NFVI 1104 includes physical or virtual resources and applications (including hypervisors) used to execute the system 1100. The VIM 1102 manages the life cycle of virtual resources with the NFVI 1104 (e.g., creation, maintenance, and tear down of virtual machines (VMs) associated with one or more physical resources); tracks VM instances; tracks performance, fault, and security of VM instances and associated physical resources; and exposes VM instances and associated physical resources to other management systems. The NFVO 1112 coordinates, authorizes, releases, and engages resources of the NFVI 1104 in order to provide requested services (e.g., to execute a core network function, component, or slice).

The VNFM 1106 manages VNFs used to execute core network 120 components/functions. The VNFM 1106 manages the life cycle of the VNFs and tracks performance, fault, and security of the virtual aspects of VNFs. The MEPM-V 1110 tracks the performance, fault and security of the functional aspects of VNFs. The tracking data from the VNFM 1106 and the MEPM-V 1110 may comprise, for example, performance measurement (PM) data used by the VIM 1102 or the NFVI 1104. Both the VNFM 1106 and the MEPM-V 1110 can scale up/down the quantity of VNFs of the system 1100.

The Mm3* reference point between MEAO 1121 and the MEPM-V 1110 is based on the Mm3 reference point discussed previously. The Mm3* reference point in this embodiment may be altered to account for the split between MEPM-V 1110 and VNFM-MEA LCMs 1106B. In addition to the reference points discussed previously with respect to FIG. 10, system 1100 includes the reference points Mv1, Mv2 and Mv3 between elements of the MEC architecture and NFV architectures to support the management of MEA-VNFs 1136 and respective MEC services 1137a. The Mv1 reference point connects the MEAO 1121 and the NFVO 1112 and is the same or similar to the Os-Ma-nfvo reference point in NFV architectures. The Mv2 reference point connects the VNFM-MEA LCM 1106B with the MEPM-V 1110 to allow LCM related notifications to be exchanged between these entities. The Mv2 reference point is the same or similar to the Ve-Vnfm-em reference point in NFV architectures. The Mv3 reference point connects the VNFM-MEA LCM 1106B with MEA-VNF 1136 instance(s) to allow the exchange of messages related to, for example, MEA LCM or initial deployment-specific configurations. The Mv3 reference point is the same or similar to the Ve-Vnfm-vnf reference point in NFV architectures.

Furthermore, the following reference points are used as they are defined for NFV architectures: The Nf-Vn reference point that connects each MEA-VNF 1136 with the NFVI 1104; the Nf-Vi reference point that connects the NFVI 1104 and the VIM 1102; the Os-Ma-nfvo reference point that connects the OSS 1022 and the NFVO 1112, which is primarily used to manage NSs (e.g., a number of VNFs connected and orchestrated to deliver a service); the Or-Vnfm reference point that connects the NFVO 1112 and the VNFM 1106a,b, which is primarily used for the NFVO 1112 to invoke VNF LCM operations; the Vi-Vnfm reference point that connects the VIM 1102 and the VNFM 1106a,b, which is primarily used by the VNFM 1106a,b to invoke resource management operations to manage cloud resources that are needed by the VNF 1137 and/or data plane (DP)-VNF 1138 (where Vi-Vnfm reference point corresponds to the Mm6 reference point discussed previously); the Or-Vi reference point that connects the NFVO 1112 and the VIM 1102, which is primarily used by the NFVO 1112 to manage cloud resources capacity; the Ve-Vnfm-em reference point that connects the VNFM 1106a,b that manages the lifecycle of the MEP 1037 with the MEPM-V 1110; the Ve-Vnfm-vnf reference point that connects the VNFM 1106a,b that manages the lifecycle of the MEP 1037 with the MEP-VNF 1137; the Nf-Vn reference point that connects the MEP-VNF 1137 and the NFVI 1104; the Nf-Vi reference point that connects the NFVI 1104 and the VIM 1102; the Os-Ma-nfvo reference point that connects the OSS 1022 and the NFVO 1112, which is primarily used to manage NSs, for example, a number of VNFs connected and orchestrated to deliver a service; the Or-Vnfm reference point that connects the NFVO 1112 and the VNFM 1106a,b that manages the lifecycle of the ME platform, which is primarily used for the NFVO 1112 to invoke VNF LCM operations; the Vi-Vnfm reference point that connects the VIM 1102 and the VNFM 1106a,b that manages the lifecycle of the MEP 1037, which is primarily used by the VNFM 1106*a,b* to invoke resource management operations to manage the cloud resources that are needed by the VNF; and the Or-Vi reference point that connects the NFVO 1112 and the VIM 1102. It is primarily used by the NFVO 1112 to manage cloud resources capacity.

When MEC is deployed in a NFV environment, the data plane (DP) 1138 may be implemented as a Physical Network Function (PNF) (e.g., as DP-PNF 1138), a VNF (e.g., as DP-VNF 1138), or combination thereof. When implemented as a DP-PNF 1138, the DP is connected to the NS that contains the MEA-VNFs 1136, and the Mp2 reference point is kept as a MEC-internal reference point also in the NFV-based deployment of MEC. In another embodiment, for performance enhancements, the Service Function Chaining (SFC) functionality provided by the underlying NFVI 1104 may be reused for traffic routing. In such a deployment, the DP 1138 and the Mp2 reference point are omitted from the system 1100. The SFC functionality in the NFVI 1104 is configured by the NFVO 1112 in the VIM 1102 based on the NFP of the NFV NS, using the Or-Vi reference point. In these embodiments, the MEAO 1121 translates the traffic rules into an NFP and sends it to the NFVO 1112. The MEP 1137 may not control the traffic redirection directly via the Mp2 reference point, but instead may pass requests to activate/deactivate/update traffic rules to the MEPM-V 1110, which will then be forwarded to the MEAO 1121. When receiving such a request, the MEAO 1121 may request the NFVO 1112 to update the NFP accordingly. Furthermore, although not shown by FIG. 11, the system 1100 may also include a network manager (NM). The NM may provide a package of end-user functions with the responsibility for the management of a network, which may include network elements with VNFs, non-virtualized network functions, or both (e.g., management of the VNFs may occur via the MEPM-V 1110).

Figure 12:
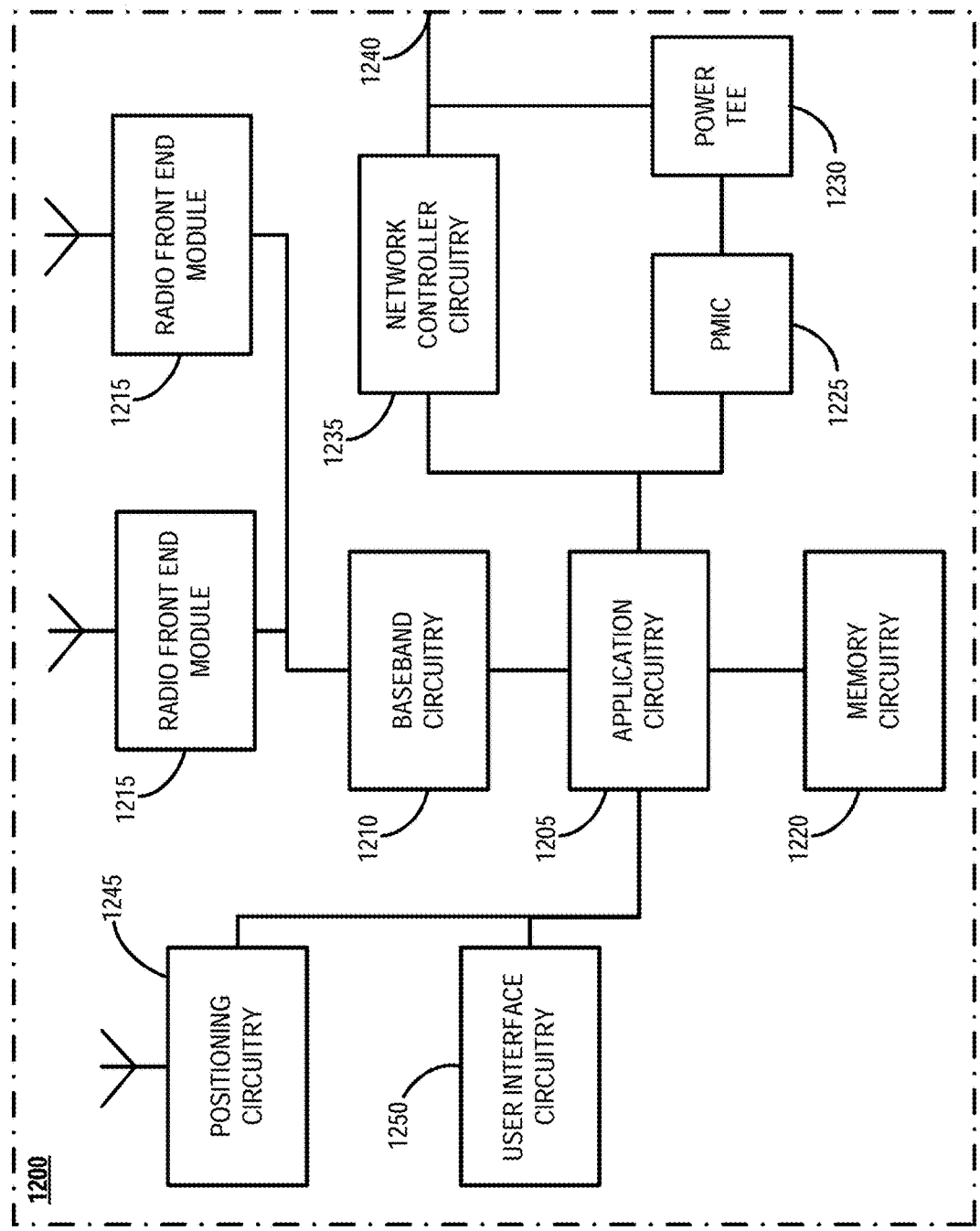
FIG. 12 depicts an example of infrastructure equipment according to various embodiments.

FIG. 12 illustrates an example of infrastructure equipment 1200 in accordance with various embodiments. The infrastructure equipment 1200 (or "system 1200") may be implemented as a base station, radio head, access network node (e.g., the edge nodes 130 shown and described previously), MEC servers 136, server(s) 150, and/or any other element/device discussed herein. In other examples, the system 1200 could be implemented in or by an intermediate node 120 or endpoint 110.

The system 1200 includes application circuitry 1205, baseband circuitry 1210, one or more radio front end modules (RFEMs) 1215, memory circuitry 1220, power management integrated circuitry (PMIC) 1225, power tee circuitry 1230, network controller circuitry 1235, network interface connector 1240, positioning circuitry 1245, and user interface 1250. In some embodiments, the device 1200 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1205 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1205 may be coupled with or may include memory/storage elements and may be configured to execute instructions stored in the memory/storage to enable various applications or operating systems to run on the system 1200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1205 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 1205 may comprise, or may be, a special-purpose processor/controller to operate according to the various embodiments herein. As examples, the processor(s) of application circuitry 1205 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1200 may not utilize application circuitry 1205, and instead may include a special-purpose processor/controller to process IP data received from an EPC or 5GC, for example.

In some implementations, the application circuitry 1205 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and/or the like. In such implementations, the circuitry of application circuitry 1205 may comprise logic blocks or logic fabric, and other interconnected resources that may be programmed to perform various functions, such as the procedures, methods, functions, etc. of the various embodiments discussed herein. In such embodiments, the circuitry of application circuitry 1205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge nodes 130, intermediate nodes 120, and/or endpoints 110 of FIG. 1 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 1205 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 1210 may be implemented, for example, as a solder-down substrate including one or more integrated circuits, a single packaged integrated circuit soldered to a main circuit board or a multi-chip module containing two or more integrated circuits. The baseband circuitry 1210 includes one or more processing devices (e.g., baseband processors) to carry out various protocol and radio control functions. Baseband circuitry 1210 may interface with application circuitry of system 1200 for generation and processing of baseband signals and for controlling operations of the RFEMs 1215. The baseband circuitry 1210 may handle various radio control functions that enable communication with one or more radio networks via the RFEMs 1215. The baseband circuitry 1210 may include circuitry such as, but not limited to, one or more single-core or multi-core processors (e.g., one or more baseband processors) or control logic to process baseband signals received from a receive signal path of the RFEMs 1215, and to generate baseband signals to be provided to the RFEMs 1215 via a transmit signal path. In various embodiments, the baseband circuitry 1210 may implement a real-time OS (RTOS) to manage resources of the baseband circuitry 1210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 12, in one embodiment, the baseband circuitry 1210 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 1215 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 1215 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1210 and/or RFEMs 1215. The baseband circuitry 1210 may also support radio communications for more than one wireless protocol.

Continuing with the aforementioned embodiment, the baseband circuitry 1210 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 950 may include one or more user interfaces designed to enable user interaction with the system 1200 or peripheral component interfaces designed to enable peripheral component interaction with the system 1200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1215, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 1210 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 1220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1220 may be implemented as one or more of solder down packaged integrated circuits, socketed memory modules and plug-in memory cards. The memory circuitry 1220 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 1200, an operating system of infrastructure equipment 1200, one or more applications, and/or for carrying out the embodiments discussed herein (such as one or more operations of depicted by FIGS. 6-9 and/or the like). The computational logic may be stored or loaded into memory circuitry 1220 as instructions for execution by the processors of the application circuitry 1205 to provide or perform the functions described herein. The various elements may be implemented by assembler instructions supported by processors of the application circuitry 1205 or high-level languages that may be compiled into such instructions. The permanent copy of the programming instructions may be placed into persistent storage devices of memory circuitry 1220 in the factory during manufacture, or in the field through, for example, a distribution medium (not shown), through a communication interface (e.g., from a distribution server), and/or over-the-air (OTA).

The PMIC 1225 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1230 may provide for electrical power drawn from a network cable to provide both power supply and data connectivity to the infrastructure equipment 1200 using a single cable.

The network controller circuitry 1235 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 1200 via network interface connector 1240 using a physical connection, which may be electrical (commonly referred to as a "copper interconnect"), optical, or wireless. The network controller circuitry 1235 may include one or more dedicated processors and/or FPGAs to communicate using one or more of the aforementioned protocols. In some implementations, the network controller circuitry 1235 may include multiple controllers to provide connectivity to other networks using the same or different protocols. In various embodiments, the network controller circuitry 1235 enables communication with associated equipment and/or with a backend system (e.g., server(s) 130 of FIG. 1), which may take place via a suitable gateway device.

The positioning circuitry 1245 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1245 may include a Micro-Technology for Positioning, Navigation, and Timing (Micro-PNT) IC that uses a master timing clock to perform position tracking/estimation without GNSS assistance. The positioning circuitry 1245 may also be part of, or interact with, the baseband circuitry 1210 and/or RFEMs 1215 to communicate with the nodes and components of the positioning network. The positioning circuitry 1245 may also provide position data and/or time data to the application circuitry 1205, which may use the data to synchronize operations with various other infrastructure equipment, or the like.

The components shown by FIG. 12 may communicate with one another using interface circuitry, which may include any number of bus and/or interconnect (IX) technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

Figure 13:
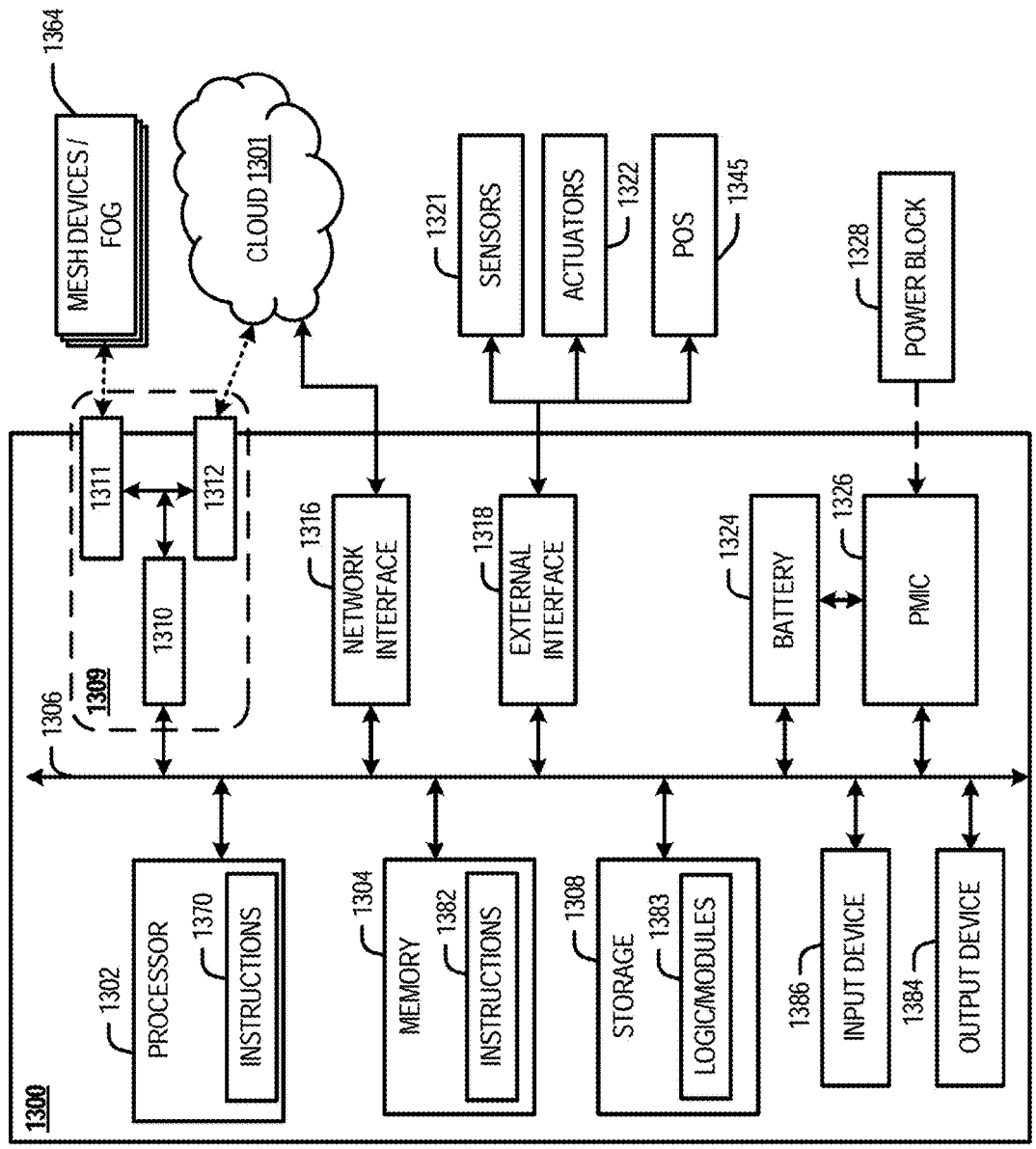
FIG. 13 depicts an example of a computer platform according to various embodiments.

FIG. 13 illustrates an example of an platform 1300 (also referred to as "system 1300," "device 1300," "appliance 1300," or the like) in accordance with various embodiments. In embodiments, the platform 1300 may be suitable for use as intermediate nodes 120 and/or endpoints 110 of FIG. 1, IoT devices 1504-1804 of FIGS. 15-18, and/or any other element/device discussed herein with regard to FIGS. 1-11. Platform 1300 may also be implemented in or as a server computer system or some other element, device, or system discussed herein. The platform 1300 may include any combinations of the components shown in the example. The components of platform 1300 may be implemented as integrated circuits (ICs), portions thereof, discrete electronic devices, or other modules, logic, hardware, software, firmware, or a combination thereof adapted in the computer platform 1300, or as components otherwise incorporated within a chassis of a larger system. The example of FIG. 13 is intended to show a high level view of components of the computer platform 1300. However, some of the components shown may be omitted, additional components may be present, and different arrangement of the components shown may occur in other implementations.

The platform 1300 includes processor circuitry 1302. The processor circuitry 1302 includes circuitry such as, but not limited to one or more processor cores and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (I/O), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 1302 may include one or more hardware accelerators, which may be microprocessors, programmable processing devices (e.g., FPGA, ASIC, etc.), or the like. The one or more hardware accelerators may include, for example, computer vision (CV) and/or deep learning (DL) accelerators. In some implementations, the processor circuitry 1302 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1302 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 1302 may be coupled with or may include memory/storage and may be configured to execute instructions stored in the memory/storage to enable various applications or operating systems to run on the platform 1300. In these embodiments, the processors (or cores) of the processor circuitry 1302 is configured to operate application software to provide a specific service to a user of the platform 1300. In some embodiments, the processor circuitry 1302 may be a special-purpose processor/controller to operate according to the various embodiments herein.

As examples, the processor circuitry 1302 may include an Intel® Architecture Core™ based processor, such as a Quark™, an Atom™, an i3, an i5, an i7, or an MCU-class processor, Pentium® processor(s), Xeon® processor(s), or another such processor available from Intel® Corporation, Santa Clara, California. However, any number other processors may be used, such as one or more of Advanced Micro Devices (AMD) Zen® Core Architecture, such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 1302 may be a part of a system on a chip (SoC), System-in-Package (SiP), a multi-chip package (MCP), and/or the like, in which the processor circuitry 1302 and other components are formed into a single integrated circuit, or a single package, such as the Edison™ or Galileo™ SoC boards from Intel® Corporation. Other examples of the processor circuitry 1302 are mentioned elsewhere in the present disclosure.

Additionally or alternatively, processor circuitry 1302 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 1302 may comprise logic blocks or logic fabric including and other interconnected resources that may be programmed to perform various functions, such as the procedures, methods, functions, etc. of the various embodiments discussed herein. In such embodiments, the circuitry of processor circuitry 1302 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 1302 may communicate with system memory circuitry 1304 over an interconnect 1306 (e.g., a bus). Any number of memory devices may be used to provide for a given amount of system memory. As examples, the memory circuitry 1304 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 1304 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 1304 may also comprise persistent storage devices, which may be temporal and/or persistent storage of any type, including, but not limited to, non-volatile memory, optical, magnetic, and/or solid state mass storage, and so forth.

The individual memory devices of memory circuitry 1304 may be implemented as one or more of solder down packaged integrated circuits, socketed memory modules, and plug-in memory cards. The memory circuitry 1304 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 1304. In embodiments, the memory circuitry 1304 may be disposed in or on a same die or package as the processor circuitry 1302 (e.g., a same SoC, a same SiP, or soldered on a same MCP as the processor circuitry 1302).

To provide for persistent storage of information such as data, applications, operating systems (OS), and so forth, a storage circuitry 1308 may also couple to the processor circuitry 1302 via the interconnect 1306. In an example, the storage circuitry 1308 may be implemented via a solid-state disk drive (SSDD). Other devices that may be used for the storage circuitry 1308 include flash memory cards, such as SD cards, microSD cards, xD picture cards, and the like, and USB flash drives. In low power implementations, the storage circuitry 1308 may be on-die memory or registers associated with the processor circuitry 1302. However, in some examples, the storage circuitry 1308 may be implemented using a micro hard disk drive (HDD). Further, any number of new technologies may be used for the storage circuitry 1308 in addition to, or instead of, the technologies described, such resistance change memories, phase change memories, holographic memories, or chemical memories, among others.

The storage circuitry 1308 store computational logic 1383 (or "modules 1383") in the form of software, firmware, or hardware commands to implement the techniques described herein. The computational logic 1383 may be employed to store working copies and/or permanent copies of computer programs, or data to create the computer programs, for the operation of various components of platform 1300 (e.g., drivers, etc.), an operating system of platform 1300, one or more applications, and/or for carrying out the embodiments discussed herein. The computational logic 1383 may be stored or loaded into memory circuitry 1304 as instructions 1382, or data to create the instructions 1382, for execution by the processor circuitry 1302 to provide the functions described herein. The various elements may be implemented by assembler instructions supported by processor circuitry 1302 or high-level languages that may be compiled into such instructions (e.g., instructions 1370, or data to create the instructions 1370). The permanent copy of the programming instructions may be placed into persistent storage devices of storage circuitry 1308 in the factory or in the field through, for example, a distribution medium (not shown), through a communication interface (e.g., from a distribution server (not shown)), or over-the-air (OTA).

In an example, the instructions 1382 provided via the memory circuitry 1304 and/or the storage circuitry 1308 of FIG. 13 are embodied as one or more non-transitory computer readable storage media (see e.g., NTCRSM 1402 of FIG. 14) including program code, a computer program product or data to create the computer program, with the computer program or data, to direct the processor circuitry 1302 of platform 1300 to perform electronic operations in the platform 1300, and/or to perform a specific sequence or flow of actions, for example, as described with respect to the flowchart(s) and block diagram(s) of operations and functionality depicted previously (see e.g., FIGS. 6-9). The processor circuitry 1302 accesses the one or more non-transitory computer readable storage media over the interconnect 1306.

Although the instructions 1382 are shown as code blocks included in the memory circuitry 1304 and the computational logic 1383 is shown as code blocks in the storage circuitry 1308, it should be understood that any of the code blocks may be replaced with hardwired circuits, for example, built into an FPGA, ASIC, or some other suitable circuitry. For example, where processor circuitry 1302 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1304 and/or storage circuitry 1308 may store program code of an operating system (OS), which may be a general purpose OS or an OS specifically written for and tailored to the computing platform 1300. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 1300, attached to the platform 1300, or otherwise communicatively coupled with the platform 1300. The drivers may include individual drivers allowing other components of the platform 1300 to interact or control various input/output (I/O) devices that may be present within, or connected to, the platform 1300. For example, the drivers may include a display driver to control and allow access to a display device, a touchscreen driver to control and allow access to a touchscreen interface of the platform 1300, sensor drivers to obtain sensor readings of sensor circuitry 1321 and control and allow access to sensor circuitry 1321, actuator drivers to obtain actuator positions of the actuators 1322 and/or control and allow access to the actuators 1322, a camera driver to control and allow access to an embedded image capture device, audio drivers to control and allow access to one or more audio devices. The OS s may also include one or more libraries, drivers, APIs, firmware, middleware, software glue, etc., which provide program code and/or software components for one or more applications to obtain and use the data from a secure execution environment (SEE), trusted execution environment (TEE), and/or management engine of the platform 1300 (not shown).

The components may communicate over the interconnect 1306. The interconnect 1306 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1306 may be a proprietary bus, for example, used in a SoC based system. Other bus systems may be included, such as an I²C interface, an SPI interface, point-to-point interfaces, and a power bus, among others.

The interconnect 1306 couples the processor circuitry 1302 to the communication circuitry 1309 for communications with other devices. The communication circuitry 1309 is a hardware element, or collection of hardware elements, used to communicate over one or more networks (e.g., cloud 1301) and/or with other devices (e.g., mesh devices/fog 1364). The communication circuitry 1309 includes baseband circuitry 1310 (or "modem 1310") and radiofrequency (RF) circuitry 1311 and 1312.

The baseband circuitry 1310 includes one or more processing devices (e.g., baseband processors) to carry out various protocol and radio control functions. Baseband circuitry 1310 may interface with application circuitry of platform 1300 (e.g., a combination of processor circuitry 1302, memory circuitry 1304, and/or storage circuitry 1308) for generation and processing of baseband signals and for controlling operations of the RF circuitry 1311 or 1312. The baseband circuitry 1310 may handle various radio control functions that enable communication with one or more radio networks via the RF circuitry 1311 or 1312. The baseband circuitry 1310 may include circuitry such as, but not limited to, one or more single-core or multi-core processors (e.g., one or more baseband processors) or control logic to process baseband signals received from a receive signal path of the RF circuitry 1311 and/or 1312, and to generate baseband signals to be provided to the RF circuitry 1311 or 1312 via a transmit signal path. In various embodiments, the baseband circuitry 1310 may implement a real-time OS (RTOS) to manage resources of the baseband circuitry 1310, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 13, in one embodiment, the baseband circuitry 1310 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G)/NR protocol entities when the communication circuitry 1309 is a cellular radiofrequency communication system, such as millimeter wave (mmWave) communication circuitry or some other suitable cellular communication circuitry. In the first example, the protocol processing circuitry 1305 would operate MAC, RLC, PDCP, SDAP, RRC, and NAS functions. In a second example, the protocol processing circuitry may operate one or more IEEE-based protocols when the communication circuitry 1309 is WiFi communication system. In the second example, the protocol processing circuitry would operate WiFi MAC and LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1310 and/or RF circuitry 1311 and 1312. The baseband circuitry 1310 may also support radio communications for more than one wireless protocol.

Continuing with the aforementioned embodiment, the baseband circuitry 1310 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 1309 also includes RF circuitry 1311 and 1312 to enable communication with wireless networks using modulated electromagnetic radiation through a non-solid medium. Each of the RF circuitry 1311 and 1312 include a receive signal path, which may include circuitry to convert analog RF signals (e.g., an existing or received modulated waveform) into digital baseband signals to be provided to the baseband circuitry 1310. Each of the RF circuitry 1311 and 1312 also include a transmit signal path, which may include circuitry configured to convert digital baseband signals provided by the baseband circuitry 1310 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 1311 or 1312 using metal transmission lines or the like.

The RF circuitry 1311 (also referred to as a "mesh transceiver") is used for communications with other mesh or fog devices 1364. The mesh transceiver 1311 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of RF circuitry 1311, configured for a particular wireless communication protocol, may be used for the connections to the mesh devices 1364. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 1311 may communicate using multiple standards or radios for communications at different ranges. For example, the platform 1300 may communicate with close/proximate devices, e.g., within about 10 meters, using a local transceiver based on BLE, or another low power radio, to save power. More distant mesh devices 1364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 1312 (also referred to as a "wireless network transceiver," a "cloud transceiver," or the like) may be included to communicate with devices or services in the cloud 1301 via local or wide area network protocols. The wireless network transceiver 1312 includes one or more radios to communicate with devices in the cloud 1301. The cloud 1301 may be the same or similar to cloud 144 discussed previously. The wireless network transceiver 1312 may be a LPWA transceiver that follows the IEEE 802.15.4, or IEEE 802.15.4g standards, among others, such as those discussed herein. The platform 1300 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 1002.15.4e specification may be used.

Any number of other radio communications and protocols may be used in addition to the systems mentioned for the mesh transceiver 1311 and wireless network transceiver 1312, as described herein. For example, the radio transceivers 1311 and 1312 may include an LTE or other cellular transceiver that uses spread spectrum (SPA/SAS) communications for implementing high-speed communications. Further, any number of other protocols may be used, such as WiFi® networks for medium speed communications and provision of network communications.

The transceivers 1311 and 1312 may include radios that are compatible with, and/or may operate according to any one or more of the following radio communication technologies and/or standards including but not limited to those discussed herein.

Network interface circuitry/controller (NIC) 1316 may be included to provide wired communication to the cloud 1301 or to other devices, such as the mesh devices 1364 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 1300 via NIC 1316 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1316 may include one or more dedicated processors and/or FPGAs to communicate using one or more of the aforementioned network interface protocols. In some implementations, the NIC 1316 may include multiple controllers to provide connectivity to other networks using the same or different protocols. For example, the platform 1300 may include a first NIC 1316 providing communications to the cloud over Ethernet and a second NIC 1316 providing communications to other devices over another type of network.

The interconnect 1306 may couple the processor circuitry 1302 to an external interface 1318 (also referred to as "I/O interface circuitry" or the like) that is used to connect external devices or subsystems. The external devices include, inter alia, sensor circuitry 1321, actuators 1322, and positioning circuitry 1345. The sensor circuitry 1321 may include devices, modules, or subsystems whose purpose is to detect events or changes in its environment and send the information (sensor data) about the detected events to some other a device, module, subsystem, etc. Examples of such sensors 1321 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 1318 connects the platform 1300 to actuators 1322, allow platform 1300 to change its state, position, and/or orientation, or move or control a mechanism or system. The actuators 1322 comprise electrical and/or mechanical devices for moving or controlling a mechanism or system, and converts energy (e.g., electric current or moving air and/or liquid) into some kind of motion. The actuators 1322 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1322 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1300 may be configured to operate one or more actuators 1322 based on one or more captured events and/or instructions or control signals received from a service provider and/or various client systems.

The positioning circuitry 1345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1345 may include a Micro-Technology for Positioning, Navigation, and Timing (Micro-PNT) IC that uses a master timing clock to perform position tracking/estimation without GNSS assistance. The positioning circuitry 1345 may also be part of, or interact with, the communication circuitry 1309 to communicate with the nodes and components of the positioning network. The positioning circuitry 1345 may also provide position data and/or time data to the application circuitry, which may use the data to synchronize operations with various infrastructure (e.g., radio base stations), for turn-by-turn navigation, or the like.

In some examples, various input/output (I/O) devices may be present within, or connected to, the platform 1300, which are referred to as input device circuitry 1386 and output device circuitry 1384 in FIG. 13. The input device circuitry 1386 and output device circuitry 1384 include one or more user interfaces designed to enable user interaction with the platform 1300 and/or peripheral component interfaces designed to enable peripheral component interaction with the platform 1300. Input device circuitry 1386 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 1384 may be included to show information or otherwise convey information, such as sensor readings, actuator position(s), or other like information. Data and/or graphics may be displayed on one or more user interface components of the output device circuitry 1384. Output device circuitry 1384 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1300. The output device circuitry 1384 may also include speakers or other audio emitting devices, printer(s), and/or the like. In some embodiments, the sensor circuitry 1321 may be used as the input device circuitry 1386 (e.g., an image capture device, motion capture device, or the like) and one or more actuators 1322 may be used as the output device circuitry 1384 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 1324 may be coupled to the platform 1300 to power the platform 1300, which may be used in embodiments where the platform 1300 is not in a fixed location. The battery 1324 may be a lithium ion battery, a lead-acid automotive battery, or a metal-air battery, such as a zinc-air battery, an aluminum-air battery, a lithium-air battery, a lithium polymer battery, and/or the like. In embodiments where the platform 1300 is mounted in a fixed location, the platform 1300 may have a power supply coupled to an electrical grid. In these embodiments, the platform 1300 may include power tee circuitry to provide for electrical power drawn from a network cable to provide both power supply and data connectivity to the platform 1300 using a single cable.

Power management integrated circuitry (PMIC) 1326 may be included in the platform 1300 to track the state of charge (SoCh) of the battery 1324, and to control charging of the platform 1300. The PMIC 1326 may be used to monitor other parameters of the battery 1324 to provide failure predictions, such as the state of health (SoH) and the state of function (SoF) of the battery 1324. The PMIC 1326 may include voltage regulators, surge protectors, power alarm detection circuitry. The power alarm detection circuitry may detect one or more of brown out (under-voltage) and surge (over-voltage) conditions. The PMIC 1326 may communicate the information on the battery 1324 to the processor circuitry 1302 over the interconnect 1306. The PMIC 1326 may also include an analog-to-digital (ADC) convertor that allows the processor circuitry 1302 to directly monitor the voltage of the battery 1324 or the current flow from the battery 1324. The battery parameters may be used to determine actions that the platform 1300 may perform, such as transmission frequency, mesh network operation, sensing frequency, and the like. As an example, the PMIC 1326 may be a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX.

A power block 1328, or other power supply coupled to a grid, may be coupled with the PMIC 1326 to charge the battery 1324. In some examples, the power block 1328 may be replaced with a wireless power receiver to obtain the power wirelessly, for example, through a loop antenna in the platform 1300. A wireless battery charging circuit, such as an LTC4020 chip from Linear Technologies of Milpitas, California, among others, may be included in the PMIC 1326. The specific charging circuits chosen depend on the size of the battery 1324, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Figure 14:
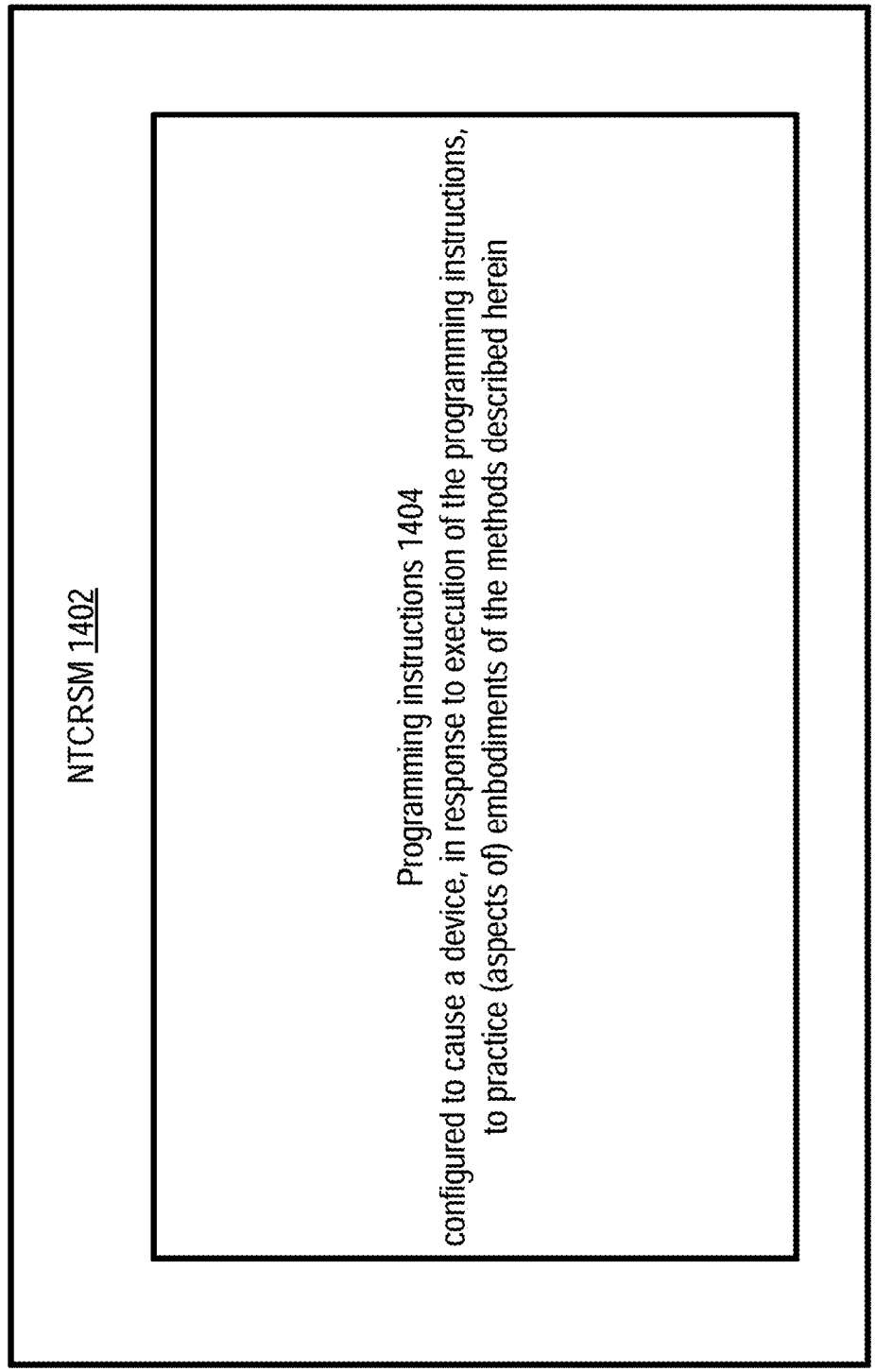
FIG. 14 illustrates an example non-transitory computer-readable storage media that may be suitable for use to store instructions (or data that creates the instructions) that cause an apparatus, in response to execution of the instructions by the apparatus, to practice selected aspects of the present disclosure.

Furthermore, the present disclosure may take the form of a computer program product or data to create the computer program, with the computer program or data embodied in any tangible or non-transitory medium of expression having the computer-usable program code (or data to create the computer program) embodied in the medium. FIG. 14 illustrates an example non-transitory computer-readable storage media (NTCRSM) that may be suitable for use to store instructions (or data that creates the instructions) that cause an apparatus (such as any of the devices/components/systems described with regard to FIGS. 1-13), in response to execution of the instructions by the apparatus, to practice selected aspects of the present disclosure. As shown, NTCRSM 1402 may include a number of programming instructions 1404 (or data to create the programming instructions). Programming instructions 1404 may be configured to enable a device (e.g., any of the devices/components/systems described with regard to FIGS. 1-13), in response to execution of the programming instructions, to perform various programming operations associated with operating system functions, one or more applications, and/or aspects of the present disclosure (including various programming operations associated with FIGS. 6-9). In some embodiments, the programming instructions 1404 (or data to create the programming instructions) to be executed may be in a pre-configured form that may require configuration instructions to install or provision the programming instructions 1404 to an apparatus (such as any of the devices/components/systems described with regard to FIGS. 1-13). When installed/provisioned, configured and executed, the programming instructions 1404 can complete or perform various programming operations associated with operating system functions, one or more applications, and/or aspects of the present disclosure (including various programming operations associated with FIGS. 6-9).

In alternate embodiments, programming instructions 1404 (or data to create the instructions) may be disposed on multiple NTCRSM 1402. In alternate embodiments, programming instructions 1404 (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1402 may be embodied by devices described for the storage circuitry 1308 and/or memory circuitry 1304 described with regard to FIG. 13. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1383, instructions 1382, 1370 discussed previously with regard to FIG. 13) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1300, partly on the system 1300, as a stand-alone software package, partly on the system 1300 and partly on a remote computer or entirely on the remote computer or server (e.g., system 1200). In the latter scenario, the remote computer may be connected to the system 1300 through any type of network, including a LAN or WAN, or the connection may be made to an external computer (e.g., through the Internet using an Internet Service Provider).

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 includes a method for data communication, the method comprising: receiving, by a receiver device, a set of packets from a transmitter device; detecting, by the receiver device, a lost packet from the set of packets; and generating, by the receiver device, a packet based on the detected lost packet.

Example 2 includes the method of example 1 and/or some other example(s) herein, wherein the generated packet is a packet loss report (PLR) message, and the method further comprises: transmitting, by the receiver device, the generated packet to the transmitter device; and receiving, by the receiver device, a First Sequence Number (FSN) message based on the PLR, wherein the FSN message indicates a sequence number (SN) of an oldest Service Data Unit (SDU) in a transmission buffer of the transmitter device.

Example 3 includes the method of example 2 and/or some other example(s) herein, wherein the FSN message further indicates a connection identifier (ID) and a traffic class ID, the connection ID identifies an anchor connection associated with the FSN message, and the traffic class ID identifies a traffic class of the anchor connection.

Example 4 includes the method of any one of examples 2-3 and/or some other example(s) herein, wherein the PLR message indicates an SN of a next expected packet.

Example 5 includes the method of example 4 and/or some other example(s) herein, further comprising: generating, by the receiver device, another PLR message when the SN of the next expected packet is not smaller than the SN indicated by the FSN message.

Example 6 includes the method of example 1 and/or some other example(s) herein, wherein the generated packet is a packet recovered using a coded packet, and wherein the coded packet is based on at least two consecutive uncoded packets.

Example 7 includes the method of example 6 and/or some other example(s) herein, further comprising: receiving, by the receiver device, a coded message from the transmitter device, wherein the coded message includes the coded packet.

Example 8 includes the method of example 7 and/or some other example(s) herein, wherein the coded message indicates an SN of a first uncoded packet used to generate the coded packet and a number of consecutive packets used to generate the coded packet (N), and the method comprises: applying, by the receiver device, a network coding algorithm to the coded packet and a plurality of consecutive uncoded packets to recover the coded packet, wherein the plurality of consecutive uncoded packets is a set of consecutive packets starting from a packet with the SN of the first uncoded packet and have a number of packets equal to N.

Example 9 includes the method of example 8 and/or some other example(s) herein, wherein the network coding algorithm is one of an exclusive OR (XOR) network coding algorithm, a random linear network coding (RLNC) algorithm, a Caterpillar RLNC (CRLNC) algorithm, and a network coded transmission control protocol (CTCP) algorithm.

Example 10 includes the method of examples 8-9 and/or some other example(s) herein, wherein the coded message further indicates a coding coefficient and a number of bits of a coding coefficient field (K), and the method comprises: performing, by the receiver device, an XOR on the plurality of consecutive uncoded packets when K is equal to zero.

Example 11 includes a method comprising: receiving, by a Multiple Access Management Service (MAMS) receiver, a burst of packets from a MAMS transmitter; generating, by the MAMS receiver, a packet loss report (PLR) message indicating one or more detected lost packets based on the burst of packets; and receiving, by the MAMS receiver, a First Sequence Number (FSN) message based on the PLR, wherein the FSN message includes an FSN, the FSN is a sequence number (SN) of an oldest Service Data Unit (SDU) in a transmission buffer of the MAMS transmitter.

Example 12 includes the method of example 11 and/or some other example(s) herein, further comprising: detecting, by the MAMS receiver, the one or more lost packet based on the burst of packets; and transmitting, by the MAMS receiver, the PLR message to the MAMS transmitter.

Example 13 includes the method of examples 11-12 and/or some other example(s) herein, wherein the generating comprises generating another PLR message only when an SN of another lost packet is greater than the FSN.

Example 14 includes the method of examples 11-13 and/or some other example(s) herein, wherein the FSN message further indicates a connection identifier (CID) and a traffic class identifier (ID), the CID identifies an anchor connection associated with the FSN message, and the traffic class ID identifies a traffic class of the anchor connection.

Example 15 includes the method of examples 11-14 and/or some other example(s) herein, wherein the PLR message includes an acknowledgement (ACK) number, wherein the ACK number is a next in-order SN that the MAMS receiver is expecting.

Example 16 includes the method of example 15 and/or some other example(s) herein, wherein the PLR message further includes a number of lost bursts, the number of lost bursts including an SN of a first lost packet of the one or more detected lost packets and a number of packets in the burst of packets.

Example 17 includes the method of examples 11-16 and/or some other example(s) herein, wherein the MAMS receiver is a Client Multi-Access Data Proxy (C-MADP) or a Network Multi-Access Data Proxy (N-MADP) and the MAMS transmitter is a different one of the C-MADP or the N-MADP.

Example 18 includes a method to be performed by a Multiple Access Management Service (MAMS) receiver, the method comprising: receiving, by the MAMS receiver, a first uncoded Multi-Access (MX) Service Data Units (SDUs) from a MAMS transmitter; receiving, by the MAMS receiver, a Coded MC SDU (CMS) message from the MAMS transmitter when a second uncoded MX SDU has not been properly received by the MAMS receiver, the CMS message including a CMS; and applying, by the MAMS receiver, a network coding algorithm to the CMS to recover the second uncoded MX SDU.

Example 19 includes the method of example 18 and/or some other example(s) herein, further comprising: detecting the second uncoded MX SDU as being a lost packet; and transmitting the a Packet Loss Report (PLR) message to the MAMS transmitter, the PLR message indicating the second uncoded MX SDU.

Example 20 includes the method of examples 18-19 and/or some other example(s) herein, wherein the CMS message further includes a Sequence Number (SN) of a first MX SDU used to generate the CMS, a number of consecutive packets used to generate the CMS, and a coding coefficient of a last uncoded MX SDU used to generate the CMS.

Example 21 includes the method of example 20 and/or some other example(s) herein, further comprising: applying, by the MAMS receiver, a network coding algorithm to the coded packet and a set of consecutive uncoded packets to recover the coded packet, wherein the set of consecutive uncoded packets is a set of packets starting from a packet with the SN of the first uncoded packet and has a number of packets equal to the number of consecutive packets used to generate the CMS.

Example 22 includes the method of example 21 and/or some other example(s) herein, further comprising: performing, by the MAMS receiver, an XOR operation on the set of consecutive uncoded packets when the number of consecutive packets used to generate the CMS is equal to two and there is no coding coefficient included in the CMS message.

Example 23 includes the method of examples 21-22 and/or some other example(s) herein, wherein the CMS message further includes a connection identifier (CID) and a traffic class identifier (ID), the CID identifies an anchor connection associated with the CMS, and the traffic class ID identifies a traffic class of the anchor connection.

Example 24 includes the method of examples 21-23 and/or some other example(s) herein, wherein the network coding algorithm is one of an XOR network coding algorithm, a random linear network coding (RLNC) algorithm, a Caterpillar RLNC (CRLNC) algorithm, and a network coded transmission control protocol (CTCP) algorithm.

Example 25 includes the method of any one of examples 18-24 and/or some other example(s) herein, wherein the MAMS receiver is a Client Multi-Access Data Proxy (C-MADP) or a Network Multi-Access Data Proxy (N-MADP) and the MAMS transmitter is a different one of the C-MADP or the N-MADP.

Example 26 may include an apparatus comprising means to perform one or more elements of a method described in or related to any of examples 1-25, or any other method or process described in the present disclosure. Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described in the present disclosure. Example 28 may include an apparatus comprising logic, modules, or circuitry to perform one or more elements of a method described in or related to any of examples 1-25, or any other method or process described in the present disclosure. Example 29 includes a method, technique, or process as described in or related to any of examples 1-25, or portions or parts thereof, or otherwise described in the present disclosure. Example 30 includes an apparatus comprising: one or more processors and one or more computer-readable media comprising instructions that, when executed by the one or more processors, cause the one or more processors to perform the method, techniques, or process as described in or related to any of examples 1-25, or portions thereof, or otherwise described in the present disclosure. The one or more computer-readable media may be one transitory or non-transitory computer-readable media. Example 31 includes at least one transitory or non-transitory computer-readable storage medium comprising data, wherein the data is to create, manufacture, or otherwise produce instructions, wherein execution of the instructions is to cause a computing device or computing system to perform the method, techniques, or process as described in or related to any of examples 1-25, or portions thereof, or otherwise described in the present disclosure.

Example 32 includes a signal as described in or related to any of examples 1-25, or portions or parts thereof, or otherwise described in the present disclosure. Example 33 includes a signal in a wireless network as shown and described in the present disclosure, or otherwise described in the present disclosure. Example 34 includes a method of communicating in a wireless network as shown and described in the present disclosure. Example 35 includes a system for providing wireless communication as shown and described in the present disclosure. Example 36 includes a device for providing wireless communication as shown and described in the present disclosure. Example 37 includes a packet, frame, segment, protocol data unit (PDU), or message as described in or related to any of examples 1-25, or portions or parts thereof, or otherwise described in the present disclosure.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "memory" and/or "memory circuitry" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like.

As used herein, the term "module" is one or more independent electronic circuits packaged onto a circuit board, SoC, SiP, MCP, etc., configured to provide a basic function within a computer system. The term "module" may refer to, be part of, or include an FPGA, ASIC, a processor (shared, dedicated, or group) and/or memory (shared, dedicated, or group) that execute one or more software or firmware programs, a combinational logic circuit, and/or other suitable components that provide the described functionality.

As used herein, the term "element" refers to a unit that is indivisible at a given level of abstraction and has a clearly defined boundary, wherein an element may be any type of entity including, for example, one or more devices, systems, controllers, network elements, modules, etc., or combinations thereof. As used herein, the term "device" refers to a physical entity embedded inside, or attached to, another physical entity in its vicinity, with capabilities to convey digital information from or to that physical entity. As used herein, the term "entity" refers to a distinct component of an architecture or device, or information transferred as a payload. As used herein, the term "controller" refers to an element or entity that has the capability to affect a physical entity, such as by changing its state or causing the physical entity to move. The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "computer system" refers to any type interconnected electronic devices, computer devices, or components thereof. Additionally, the term "computer system" and/or "system" refers to various components of a computer that are communicatively coupled with one another, or otherwise organized to accomplish one or more functions. Furthermore, the term "computer system" and/or "system" refers to multiple computer devices and/or multiple computing systems that are communicatively coupled with one another and configured to share computing and/or networking resources. As used herein, the term "architecture" refers to a fundamental organization of a system embodied in its components, their relationships to one another, and to an environment, as well as to the principles guiding its design and evolution. As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices for the purpose of transmitting and receiving information.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP 5G or NR, Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, Zig-Bee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, mmWave standards in general (e.g., wireless systems operating at 10-300 GHz and above such as WiGig, IEEE 802.11ad, IEEE 802.11ay, etc.), Vehicle-to-Everything (V2X) communication technologies, 3GPP cellular V2X, Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

As used herein, the terms "instantiate," "instantiation," and the like refers to the creation of an instance, and an "instance" refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" may refer to a resource hosted by a remote entity (e.g., a cloud computing service) and accessible over a network. The term "on-device resource" may refer to a resource hosted inside a device and enabling access to the device, and thus, to the related physical entity. System resources may be considered as a set of coherent functions, network data objects or services, accessible through a server where such system resources reside on a single host or multiple hosts and are clearly identifiable. Additionally, a "virtualized resource" may refer to compute, storage, and/or network resources provided by virtualization infrastructure to an application, such as a multi-access edge applications The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:
1. An apparatus, comprising:
memory circuitry; and
processor circuitry connected to the memory circuitry, wherein the processor circuitry is to operate a client to:
identify a set of data packets received from a gateway;
detect at least one lost data packet from the set of data packets;
generate a packet loss report (PLR) message to report the at least one lost data packet;
cause transmission of the PLR message to the gateway; and
receive, from the gateway, the at least one lost data packet retransmitted by the gateway when the at least one lost data packet is found; or
receive, from the gateway, a first sequence number (FSN) message when the at least one lost data packet is not found for retransmission, wherein the FSN message indicates an oldest unacknowledged data packet in a transmission buffer at the gateway, and not report any packet loss with a sequence number (SN) that is smaller than the FSN, wherein the FSN message includes an FSN field, wherein the FSN field includes an SN of the oldest data packet in the transmission buffer at the gateway.

2. The apparatus of claim 1, wherein the PLR message includes an acknowledgement (ACK) number field, wherein the ACK number field includes a next in-order SN that the client is expecting.

3. The apparatus of claim 1, wherein the PLR message includes a number of loss bursts field, wherein the number of loss bursts field includes an SN of a first lost data packet in a burst of packets in the set of data packets and a number of consecutive lost data packets in the burst of packets.

4. The apparatus of claim 1, wherein the client is a Multiple Access Management Service (MAMS) client, and the gateway is a MAMS gateway.

5. The apparatus of claim 1, wherein the set of data packets includes a set of generic multi-access (GMA) service data units (SDUs).

6. The apparatus of claim 5, wherein each data packet in the set of data packets is a GMA protocol data unit (PDU) that includes a GMA SDU from among the set of GMA SDUs.

7. One or more non-transitory computer-readable media (NTCRM) comprising instructions for operating a Multiple Access Management Service (MAMS) client, wherein execution of the instructions by one or more processors of a computing device is to cause the computing device to:
    identify a set of data packets received from a MAMS gateway;
    detect at least one lost data packet from the set of data packets;
    generate a packet loss report (PLR) message to report the at least one lost data packet;
    cause transmission of the PLR message to the MAMS gateway;
    receive, from the MAMS gateway, the at least one lost data packet retransmitted by the MAMS gateway when at least one lost data packet, or
    receive, from the MAMS gateway, a first sequence number (FSN) message when the MAMS gateway does not find the at least one lost data packet, wherein the FSN message is to indicate an oldest unacknowledged data packet in a transmission buffer at the MAMS gateway, and
    not report any packet loss with a sequence number (SN) that is smaller than the FSN, wherein the FSN message includes an FSN field, wherein the FSN field includes an SN of the oldest data packet in the transmission buffer at the gateway.

8. The one or more NTCRM of claim 7, wherein the PLR message includes an acknowledgement (ACK) number field, wherein the ACK number field is to include a next in-order SN that the MAMS client is expecting.

9. The one or more NTCRM of claim 7, wherein the PLR message includes a number of loss bursts field, wherein the number of loss bursts field is to include an SN of a first lost data packet in a burst of packets in the set of data packets and a number of consecutive lost data packets in the burst of packets.

10. The one or more NTCRM of claim 7, wherein the set of data packets includes a set of generic multi-access (GMA) service data units (SDUs).

11. A method of operating a Multiple Access Management Service (MAMS) client, the method comprising:
    identifying a set of data packets received from a MAMS gateway;
    detecting at least one lost data packet from the set of data packets;
    generating a packet loss report (PLR) message to report the at least one lost data packet;
    transmitting the PLR message to the MAMS gateway; and
    receiving, from the MAMS gateway, the at least one lost data packet retransmitted by the MAMS gateway in response to the at least one lost data packet being found; or
    receiving, from the MAMS gateway, a first sequence number (FSN) message in response to the at least one lost data packet not being found, wherein the FSN message indicates an oldest unacknowledged data packet in a transmission buffer at the MAMS gateway, and
    not reporting any packet loss with a sequence number (SN) that is smaller than the FSN, wherein the FSN message includes an FSN field, wherein the FSN field includes an SN of the oldest data packet in the transmission buffer at the gateway.

12. The method of claim 11, wherein the PLR message includes an acknowledgement (ACK) number field, wherein the ACK number field includes a next in-order SN that the MAMS client is expecting.

13. The method of claim 11, wherein the PLR message includes a number of loss bursts field, wherein the number of loss bursts field includes an SN of a first lost data packet in a burst of packets in the set of data packets and a number of consecutive lost data packets in the burst of packets.

14. The method of claim 11, wherein the set of data packets includes a set of generic multi-access (GMA) service data units (SDUs).

15. The method of claim 14, wherein each data packet in the set of data packets is a GMA protocol data unit (PDU) that includes a GMA SDU from among the set of GMA SDUs.

16. An apparatus, comprising:
    memory circuitry to store program code of a Multiple Access Management Service (MAMS) client; and
    processor circuitry connected to the memory circuitry, wherein the processor circuitry is to execute the program code to:
    identify a set of data packets received from a MAMS gateway;
    detect at least one lost data packet from the set of data packets;
    generate a packet loss report (PLR) message to report the at least one lost data packet;
    cause transmission of the PLR message to the MAMS gateway; and
    receive, from the MAMS gateway, the at least one lost data packet retransmitted by the MAMS gateway when the at least one lost data packet is found; or
    receive, from the MAMS gateway, a first sequence number (FSN) message when the at least one lost data packet is not found at the MAMS gateway, wherein the FSN message indicates an oldest unacknowledged data packet in a transmission buffer at the MAMS gateway, and
    not report any packet loss with an sequence number (SN) that is smaller than the FSN, wherein the FSN message includes an FSN field, wherein the FSN field includes an SN of the oldest data packet in the transmission buffer at the gateway.

17. The apparatus of claim 16, wherein the PLR message includes an acknowledgement (ACK) number field, wherein the ACK number field includes a next in-order SN that the MAMS client is expecting.

18. The apparatus of claim 16, wherein the PLR message includes a number of loss bursts field, wherein the number of loss bursts field includes an SN of a first lost data packet in a burst of packets in the set of data packets and a number of consecutive lost data packets in the burst of packets.

19. The apparatus of claim 16, wherein the set of data packets includes a set of generic multi-access (GMA) service data units (SDUs).

20. The apparatus of claim 19, wherein each data packet in the set of data packets is a GMA protocol data unit (PDU) that includes a GMA SDU from among the set of GMA SDUs.

21. One or more non-transitory computer-readable media (NTCRM) comprising instructions for operating a Multiple Access Management Service (MAMS) gateway, wherein execution of the instructions by one or more processors of a computing device is to cause the computing device to:
transmit, from the MAMS gateway, a set of data packets to a MAMS client;
identify a packet loss report (PLR) message received from the MAMS client, wherein the PLR message indicates at least one lost data packet from the set of data packets;
search, from the MAMS gateway, a transmission buffer for the at least one lost data packet; and
retransmit, from the MAMS gateway, the at least one lost data packet to the MAMS client when the at least one lost data packet is found in the transmission buffer; or
transmit, from the MAMS gateway, a first sequence number (FSN) message when the at least one lost data packet is not found in the transmission buffer, wherein the FSN message indicates an oldest unacknowledged data packet in the transmission buffer, wherein the MAMS client does not report an SN that is smaller than the SN of the oldest unacknowledged data packet in the transmission buffer in another PLR message, wherein the FSN message includes an FSN field, wherein the FSN field includes an SN of the oldest data packet in the transmission buffer at the gateway.

22. The one or more NTCRM of claim 21, wherein the PLR message includes an acknowledgement (ACK) number field, wherein the ACK number field includes a next in-order sequence number (SN) that the MAMS client is expecting.

23. The one or more NTCRM of claim 21, wherein the PLR message includes a number of loss bursts field, wherein the number of loss bursts field includes an SN of a first lost data packet in a burst of packets in the set of data packets and a number of consecutive lost data packets in the burst of packets.

24. The one or more NTCRM of claim 21, wherein the set of data packets includes a set of generic multi-access (GMA) service data units (SDUs).

25. The one or more NTCRM of claim 24, wherein each data packet in the set of data packets is a GMA protocol data unit (PDU) that includes a GMA SDU from among the set of GMA SDUs.

26. A method of operating a Multiple Access Management Service (MAMS) gateway, the method comprising:
transmitting, from the MAMS gateway, a set of data packets to a MAMS client;
identifying a packet loss report (PLR) message received from the MAMS client, wherein the PLR message indicates at least one lost data packet from the set of data packets;
searching, from the MAMS gateway, a transmission buffer for the at least one lost data packet; and
retransmitting, from the MAMS gateway, the at least one lost data packet to the MAMS client in response to the at least one lost data packet being found in the transmission buffer; or
transmitting, from the MAMS gateway, a first sequence number (FSN) message in response to the at least one lost data packet not being found in the transmission buffer, wherein the FSN message indicates an oldest unacknowledged data packet in the transmission buffer, and wherein the MAMS client does not report an SN that is smaller than the SN of the oldest unacknowledged data packet in the transmission buffer in another PLR message, wherein the FSN message includes an FSN field, wherein the FSN field includes an SN of the oldest data packet in the transmission buffer at the MAMS gateway.

27. The method of claim 26, wherein the PLR message includes an acknowledgement (ACK) number field, wherein the ACK number field includes a next in-order sequence number (SN) that the MAMS client is expecting.

28. The method of claim 26, wherein the PLR message includes a number of loss bursts field, wherein the number of loss bursts field includes an SN of a first lost data packet in a burst of packets in the set of data packets and a number of consecutive lost data packets in the burst of packets.

29. The method of claim 26, wherein the set of data packets includes a set of generic multi-access (GMA) service data units (SDUs).

30. The method of claim 29, wherein each data packet in the set of data packets is a GMA protocol data unit (PDU) that includes a GMA SDU from among the set of GMA SDUs.

31. An apparatus, comprising:
memory circuitry to store program code of a Multiple Access Management Service (MAMS) gateway; and
processor circuitry connected to the memory circuitry, wherein the processor circuitry is to execute the program code to:
transmit, from the MAMS gateway, a set of data packets to a MAMS client;
identify a packet loss report (PLR) message received from the MAMS client, wherein the PLR message indicates at least one lost data packet from the set of data packets;
search, from the MAMS gateway, a transmission buffer for the at least one lost data packet; and
retransmit, from the MAMS gateway, the at least one lost data packet to the MAMS client when the at least one lost data packet is found in the transmission buffer; or
transmit, from the MAMS gateway, a first sequence number (FSN) message when the at least one lost data packet is not found in the transmission buffer, wherein the FSN message is to indicate an oldest unacknowledged data packet in the transmission buffer, and wherein the MAMS client does not report an SN that is smaller than the SN of the oldest unacknowledged data packet in the transmission buffer in another PLR message, wherein the FSN message includes an FSN field, wherein the FSN field includes an SN of the oldest data packet in the transmission buffer at the MAMS gateway.

32. The apparatus of claim 31, wherein the PLR message includes an acknowledgement (ACK) number field, wherein the ACK number field includes a next in-order sequence number (SN) that the MAMS client is expecting.

33. The apparatus of claim 31, wherein the PLR message includes a number of loss bursts field, wherein the number of loss bursts field includes an SN of a first lost data packet in a burst of packets in the set of data packets and a number of consecutive lost data packets in the burst of packets.

34. The apparatus of claim 31, wherein the set of data packets includes a set of generic multi-access (GMA) service data units (SDUs).

35. The apparatus of claim 34, wherein each data packet in the set of data packets is a GMA protocol data unit (PDU) that includes a GMA SDU from among the set of GMA SDUs.

\* \* \* \* \*